United States Patent
Zhang et al.

(10) Patent No.: US 12,363,569 B2
(45) Date of Patent: Jul. 15, 2025

(54) INTER-UE CROSS-LINK INTERFERENCE AWARE BEAM FAILURE DETECTION AND RADIO LINK MANAGEMENT

(71) Applicant: QUALCOMM Incorporated, San Diego, CA (US)

(72) Inventors: Qian Zhang, Basking Ridge, NJ (US); Yan Zhou, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 349 days.

(21) Appl. No.: 17/890,936

(22) Filed: Aug. 18, 2022

(65) Prior Publication Data

US 2024/0064540 A1 Feb. 22, 2024

(51) Int. Cl.
  *H04W 24/08* (2009.01)
  *H04B 17/336* (2015.01)
  *H04L 5/00* (2006.01)
  *H04W 24/10* (2009.01)
  *H04W 76/19* (2018.01)

(52) U.S. Cl.
  CPC .......... *H04W 24/08* (2013.01); *H04B 17/336* (2015.01); *H04L 5/0051* (2013.01); *H04W 24/10* (2013.01); *H04W 76/19* (2018.02)

(58) Field of Classification Search
  None
  See application file for complete search history.

(56) References Cited

U.S. PATENT DOCUMENTS

| | | | |
|---|---|---|---|
| 2021/0329473 A1 | 10/2021 | Zhang et al. | |
| 2021/0345201 A1* | 11/2021 | Cheng | H04W 36/0085 |
| 2021/0351838 A1* | 11/2021 | Zhang | H04B 7/0695 |
| 2021/0409097 A1 | 12/2021 | Zhang et al. | |
| 2022/0039006 A1* | 2/2022 | Zhou | H04W 68/005 |
| 2022/0386154 A1* | 12/2022 | Maattanen | H04W 24/08 |

OTHER PUBLICATIONS

Interdigital, Inc., "Discussion on Enhancements of Dynamic TDD Operations", 3GPP TSG RAN WG1 #109-e, R1-2204070, e-Meeting, May 9-20, 2022, 3Rd Generation Partnership Project 3Gpp, Mobile Competence Centre, 650, Route Des Lucioles, F-06921 Sophia-antipolis Cedex, France vol. RAN WG1, No. e-Meeting, May 9, 2022-May 20, 2022, Apr. 29, 2022, XP052153348, 7 Pages, p. 4-p. 5, figure 1.

International Search Report and Written Opinion—PCT/US2023/072310—ISA/EPO—Dec. 8, 2023 (2206650WO).

\* cited by examiner

*Primary Examiner* — Srinivasa R Reddivalam

(74) *Attorney, Agent, or Firm* — Holland & Hart LLP

(57) ABSTRACT

Methods, systems, and devices for wireless communications are described. A first user equipment (UE) may receive a control message indicating a set of interference measurement resources (IMRs) for reference signal transmission associated with radio link monitoring or beam failure monitoring. The first UE may receive, from a second UE via the set of IMRs, reference signals associated with radio link monitoring or beam failure monitoring based on the control message. The first UE may transmit, in response to receiving the reference signals, a beam failure report associated with the radio link monitoring or the beam failure monitoring based on one or more measurements of the one or more reference signals. In some examples, the beam failure report may indicate that beam failure is associated with cross-link interference (CLI) from the second UE.

27 Claims, 15 Drawing Sheets

INTER-UE CROSS-LINK INTERFERENCE AWARE BEAM FAILURE DETECTION AND RADIO LINK MANAGEMENT

FIELD OF TECHNOLOGY

The following relates to wireless communications, including inter-user equipment (UE) cross-link interference aware beam failure detection and radio link management.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support inter-UE cross-link interference (CLI) aware beam failure detection and radio link management. For example, the described techniques provide for configuring one or more interference measurement resources (IMRs) associated with radio link monitoring or beam failure monitoring for a beam failure detection procedure, or both. For example, a network entity may configure one or more UEs with one or more IMRs for radio link monitoring or beam failure monitoring. A first UE may monitor the IMRs to determine whether CLI is causing a beam failure or a radio link failure. For example, a second UE may transmit signaling to a network entity, which may affect downlink reception at the first UE. The second UE may transmit reference signals on the IMRs which may be received at the first UE. If the first UE detects beam failure, the first UE may determine whether CLI from the second UE is causing, or contributing to, the beam failure based on measurements of the reference signals transmitted over the IMRs. Based on the beam failure, the first UE may transmit a beam failure report to the network entity. In some examples, the beam failure report may indicate that the beam failure is based on CLI or channel quality degradation, or both. For example, the beam failure report may indicate a reason for the beam failure.

If CLI causes the beam failure, the devices may implement techniques to perform beam recovery. For example, the network entity, the first UE, or the second UE, or any combination thereof, may implement techniques for a beam recovery based on CLI impacting beam failure. For example, the network entity may configure a different scheduling configuration for the first UE or the second UE, or both, such that the first UE is not scheduled to receive downlink signaling while the second UE is scheduled to transmit uplink signaling. Additionally, or alternatively, the network entity may configure a different downlink beam for the first UE or a different uplink beam for the second UE. In some examples, the network entity may adjust a transmit power for the second UE or adjust a transmit power of the network entity for the downlink signaling to the first UE to reduce the effects of the CLI.

A method for wireless communications at a first UE is described. The method may include receiving a control message indicating a set of IMRs for reference signal transmission associated with radio link monitoring or beam failure monitoring, receiving, from a second UE via the set of IMRs, one or more reference signals associated with radio link monitoring or beam failure monitoring based on the control message, and transmitting, in response to receiving the one or more reference signals, a beam failure report associated with the radio link monitoring or the beam failure monitoring based on one or more measurements of the one or more reference signals.

An apparatus for wireless communications at a first UE is described. The apparatus may include a processor, memory coupled with the processor, and instructions stored in the memory. The instructions may be executable by the processor to cause the apparatus to receive a control message indicating a set of IMRs for reference signal transmission associated with radio link monitoring or beam failure monitoring, receive, from a second UE via the set of IMRs, one or more reference signals associated with radio link monitoring or beam failure monitoring based on the control message, and transmit, in response to receiving the one or more reference signals, a beam failure report associated with the radio link monitoring or the beam failure monitoring based on one or more measurements of the one or more reference signals.

Another apparatus for wireless communications at a first UE is described. The apparatus may include means for receiving a control message indicating a set of IMRs for reference signal transmission associated with radio link monitoring or beam failure monitoring, means for receiving, from a second UE via the set of IMRs, one or more reference signals associated with radio link monitoring or beam failure monitoring based on the control message, and means for transmitting, in response to receiving the one or more reference signals, a beam failure report associated with the radio link monitoring or the beam failure monitoring based on one or more measurements of the one or more reference signals.

A non-transitory computer-readable medium storing code for wireless communications at a first UE is described. The code may include instructions executable by a processor to receive a control message indicating a set of IMRs for reference signal transmission associated with radio link monitoring or beam failure monitoring, receive, from a second UE via the set of IMRs, one or more reference signals associated with radio link monitoring or beam failure monitoring based on the control message, and transmit, in response to receiving the one or more reference signals, a beam failure report associated with the radio link monitoring or the beam failure monitoring based on one or more measurements of the one or more reference signals.

In some examples of the method, apparatuses, and non-transitory computer-readable medium described herein, transmitting the beam failure report may include operations, features, means, or instructions for transmitting the beam failure report indicating cross-link interference from the second UE based on measuring the one or more reference signals.

In some examples of the method, apparatuses, and non-transitory computer-readable medium described herein, transmitting the beam failure report may include operations, features, means, or instructions for transmitting the beam failure report indicating a beam failure detection based on measuring the one or more reference signals.

In some examples of the method, apparatuses, and non-transitory computer-readable medium described herein, transmitting the beam failure report may include operations, features, means, or instructions for transmitting the beam failure report indicating a radio link failure based on measuring the one or more reference signals.

In some examples of the method, apparatuses, and non-transitory computer-readable medium described herein, transmitting the beam failure report may include operations, features, means, or instructions for transmitting the beam failure report indicating a beam failure occurred based on a cross-link interference from the second UE or a channel quality reduction, or both.

Some examples of the method, apparatuses, and non-transitory computer-readable medium described herein may further include operations, features, means, or instructions for receiving, in response to the beam failure report, a second control message indicating a transmit power parameter, a transmit beam parameter, a resource assignment, or any combination thereof.

In some examples of the method, apparatuses, and non-transitory computer-readable medium described herein, receiving the control message may include operations, features, means, or instructions for receiving the control message indicating a sounding reference signal resource identifier, where the one or more reference signals from the second UE may be one or more sounding reference signals.

In some examples of the method, apparatuses, and non-transitory computer-readable medium described herein, receiving the control message may include operations, features, means, or instructions for receiving the control message indicating a subcarrier spacing, a quantity of physical resource blocks, a starting physical resource block, a starting position, a quantity of symbols, a transmission configuration indicator state, or any combination thereof, for the set of IMRs.

In some examples of the method, apparatuses, and non-transitory computer-readable medium described herein, receiving the control message may include operations, features, means, or instructions for receiving the control message indicating a serving cell identifier or a physical cell identifier for a serving cell of the second UE, where the serving cell of the second UE may be different from a network entity serving the first UE.

In some examples of the method, apparatuses, and non-transitory computer-readable medium described herein, receiving the control message may include operations, features, means, or instructions for receiving the control message indicating a set of channel measurement resources for second reference signal transmission associated with the radio link monitoring or the beam failure monitoring, receiving, via the set of channel measurement resources, one or more second reference signals based on the control message, and transmitting a measurement report based on measuring the one or more second reference signals.

A method for wireless communications at a network entity is described. The method may include transmitting, to a first UE, a first control message indicating a set of IMRs associated with radio link monitoring or beam failure monitoring for reference signal transmission from a second UE, receiving, from the first UE, a beam failure report based on the set of IMRs, and transmitting, in response the beam failure report, a second control message indicating a set of parameters for beam failure recovery.

An apparatus for wireless communications at a network entity is described. The apparatus may include a processor, memory coupled with the processor, and instructions stored in the memory. The instructions may be executable by the processor to cause the apparatus to transmit, to a first UE, a first control message indicating a set of IMRs associated with radio link monitoring or beam failure monitoring for reference signal transmission from a second UE, receive, from the first UE, a beam failure report based on the set of IMRs, and transmit, in response the beam failure report, a second control message indicating a set of parameters for beam failure recovery.

Another apparatus for wireless communications at a network entity is described. The apparatus may include means for transmitting, to a first UE, a first control message indicating a set of IMRs associated with radio link monitoring or beam failure monitoring for reference signal transmission from a second UE, means for receiving, from the first UE, a beam failure report based on the set of IMRs, and means for transmitting, in response the beam failure report, a second control message indicating a set of parameters for beam failure recovery.

A non-transitory computer-readable medium storing code for wireless communications at a network entity is described. The code may include instructions executable by a processor to transmit, to a first UE, a first control message indicating a set of IMRs associated with radio link monitoring or beam failure monitoring for reference signal transmission from a second UE, receive, from the first UE, a beam failure report based on the set of IMRs, and transmit, in response the beam failure report, a second control message indicating a set of parameters for beam failure recovery.

In some examples of the method, apparatuses, and non-transitory computer-readable medium described herein, receiving the beam failure report may include operations, features, means, or instructions for receiving the beam failure report indicating CLI from the second UE.

In some examples of the method, apparatuses, and non-transitory computer-readable medium described herein, receiving the beam failure report may include operations, features, means, or instructions for receiving the beam failure report indicating a beam failure detection based on the set of IMRs.

In some examples of the method, apparatuses, and non-transitory computer-readable medium described herein, receiving the beam failure report may include operations, features, means, or instructions for receiving the beam failure report indicating a radio link failure based on the set of IMRs.

In some examples of the method, apparatuses, and non-transitory computer-readable medium described herein, receiving the beam failure report may include operations, features, means, or instructions for receiving the beam failure report indicating a beam failure occurred based on a CLI from the second UE or a channel quality reduction, or both.

In some examples of the method, apparatuses, and non-transitory computer-readable medium described herein, transmitting the second control message may include operations, features, means, or instructions for transmitting the second control message to the first UE or the second UE, or both, indicating a transmit power parameter, a transmit beam parameter, a resource assignment, or any combination thereof.

In some examples of the method, apparatuses, and non-transitory computer-readable medium described herein, transmitting the first control message may include operations, features, means, or instructions for transmitting the first control message indicating a sounding reference signal resource identifier, where the reference signal transmission may be sounding reference signal transmission.

In some examples of the method, apparatuses, and non-transitory computer-readable medium described herein, transmitting the first control message may include operations, features, means, or instructions for transmitting the first control message indicating a subcarrier spacing, a quantity of physical resource blocks, a starting physical resource block, a starting position, a quantity of symbols, a transmission configuration indicator state, or any combination thereof, for the set of IMRs.

In some examples of the method, apparatuses, and non-transitory computer-readable medium described herein, transmitting the first control message may include operations, features, means, or instructions for transmitting the first control message indicating a serving cell identifier or a physical cell identifier for a serving cell of the second UE, where the serving cell of the second UE may be different from the network entity.

In some examples of the method, apparatuses, and non-transitory computer-readable medium described herein, transmitting the first control message may include operations, features, means, or instructions for transmitting the first control message indicating a set of channel measurement resources for second reference signal transmission associated with the radio link monitoring or the beam failure monitoring, transmitting, to the first UE, one or more reference signals via the set of channel measurement resources based on the first control message, and receiving a second measurement report from the first UE indicating measurements for the one or more reference signals.

A method for wireless communications at a second UE is described. The method may include receiving a control message indicating a set of IMRs for reference signal transmission associated with radio link monitoring or beam failure monitoring and transmitting, via the set of IMRs, one or more reference signals in response to the control message.

An apparatus for wireless communications at a second UE is described. The apparatus may include a processor, memory coupled with the processor, and instructions stored in the memory. The instructions may be executable by the processor to cause the apparatus to receive a control message indicating a set of IMRs for reference signal transmission associated with radio link monitoring or beam failure monitoring and transmit, via the set of IMRs, one or more reference signals in response to the control message.

Another apparatus for wireless communications at a second UE is described. The apparatus may include means for receiving a control message indicating a set of IMRs for reference signal transmission associated with radio link monitoring or beam failure monitoring and means for transmitting, via the set of IMRs, one or more reference signals in response to the control message.

A non-transitory computer-readable medium storing code for wireless communications at a second UE is described. The code may include instructions executable by a processor to receive a control message indicating a set of IMRs for reference signal transmission associated with radio link monitoring or beam failure monitoring and transmit, via the set of IMRs, one or more reference signals in response to the control message.

Some examples of the method, apparatuses, and non-transitory computer-readable medium described herein may further include operations, features, means, or instructions for receiving a second control message indicating a transmit power parameter, a transmit beam parameter, a resource assignment, or any combination thereof.

In some examples of the method, apparatuses, and non-transitory computer-readable medium described herein, receiving the control message may include operations, features, means, or instructions for receiving the control message indicating a sounding reference signal resource identifier, where the one or more reference signals may be one or more sounding reference signals.

In some examples of the method, apparatuses, and non-transitory computer-readable medium described herein, receiving the control message may include operations, features, means, or instructions for receiving the control message indicating a subcarrier spacing, a quantity of physical resource blocks, a starting physical resource block, a starting position, a quantity of symbols, a transmission configuration indicator state, or any combination thereof, for the set of IMRs.

DETAILED DESCRIPTION

Figure 1:
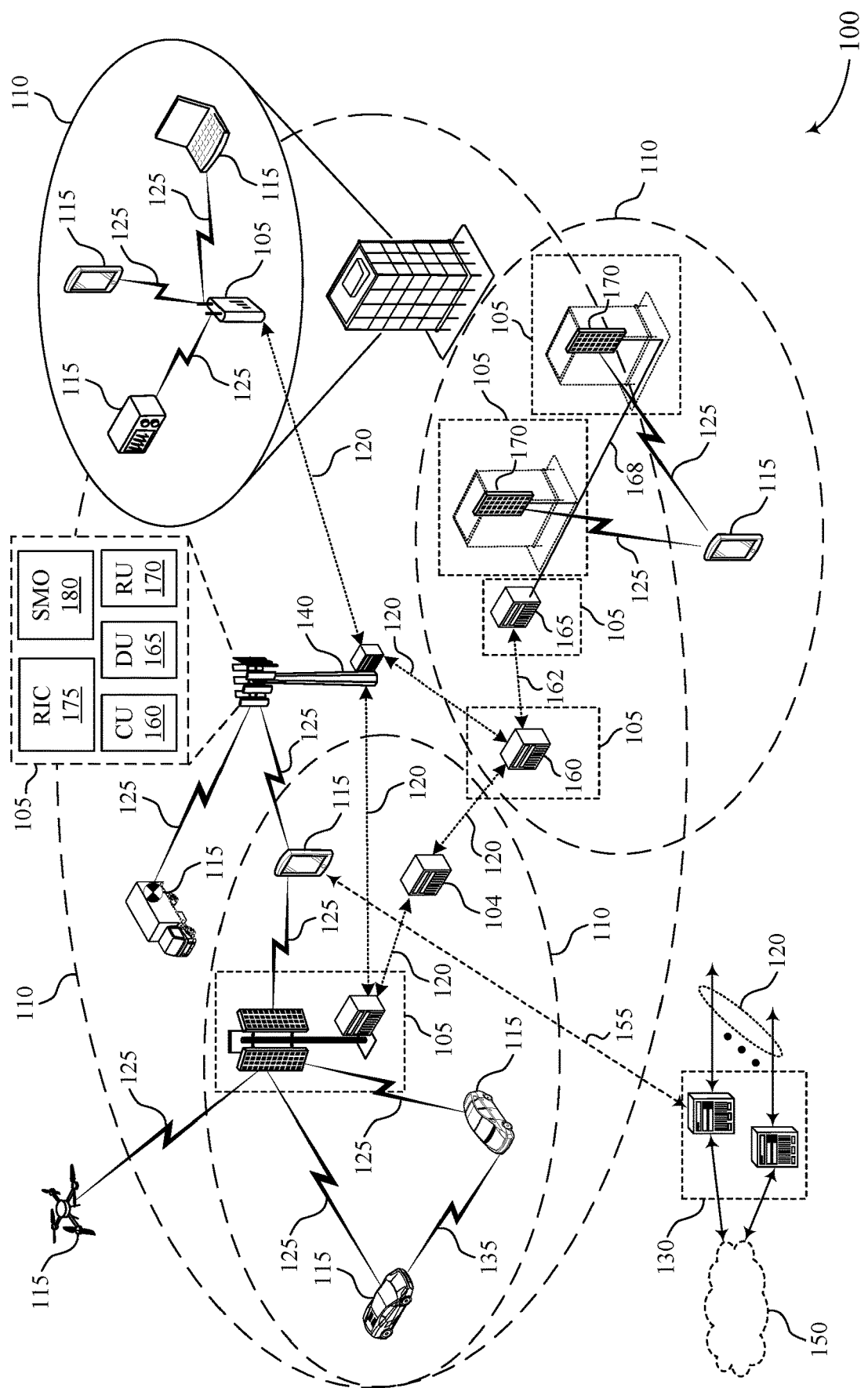
FIG. 1 illustrates an example of a wireless communications system that supports inter-UE cross-link interference (CLI) aware beam failure detection and radio link management in accordance with one or more aspects of the present disclosure.

Some systems support full duplex communications, where a device may transmit and receive simultaneously. For example, a network entity may communicate according to sub-band full duplex operations, enabling simultaneous transmission and reception during a same slot. In some cases, full duplex operations may increase a likelihood of cross-link interference (CLI). For example, a network entity may transmit downlink signaling to a first UE while receiving uplink signaling from a second UE. In some cases, the transmission from the second UE may interfere with reception of the downlink signaling at the first UE. CLI may result in a sudden change to radio conditions at the first UE, which may result in beam failure or radio link failure. Some systems may support radio link monitoring and beam failure detection to resolve beam failure or radio link failure. However, some radio link monitoring and beam failure detection techniques may rely on a UE to perform a random access procedure to re-establish the link, which may significantly delay communications.

The techniques described herein support configuring an interference measurement resource (IMR) for radio link monitoring or beam failure monitoring. A first UE (e.g., a downlink receiving UE) may monitor the IMR to determine whether CLI is causing a beam failure. For example, a second UE (e.g., an uplink transmitting UE) may transmit signaling to a network entity, which may affect downlink reception at the first UE. The second UE may transmit reference signals on the IMR which may be received at the first UE. If the first UE detects beam failure, the first UE may determine whether CLI from the second UE is causing, or contributing to, the beam failure based on the reference signals on the IMR. Based on the beam failure, the first UE may transmit a beam failure report to the network entity. In some examples, the beam failure report may indicate that the beam failure is based on CLI or channel quality degradation, or both. For example, the beam failure report may indicate a reason for the beam failure.

If CLI causes the beam failure, the devices may implement techniques to perform beam recovery. For example, the network entity, the first UE, or the second UE, or any combination thereof, may implement techniques for a beam recovery without the first UE performing a random access procedure. For example, the network entity may configure a different scheduling configuration for the first UE or the second UE, or both, such that the first UE is not scheduled to receive downlink signaling while the second UE is scheduled to transmit uplink signaling. Additionally, or alternatively, the network entity may configure a different downlink beam for the first UE or a different uplink beam for the second UE. In some examples, the network entity may adjust a transmit power for the second UE or adjust a transmit power of the network entity for the downlink signaling to the first UE to reduce the effects of the CLI.

Aspects of the disclosure are initially described in the context of wireless communications systems. Aspects of the disclosure are further illustrated by and described with reference to apparatus diagrams, system diagrams, and flowcharts that relate to inter-UE CLI aware beam failure detection and radio link management.

FIG. 1 illustrates an example of a wireless communications system 100 that supports inter-UE CLI aware beam failure detection and radio link management in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support inter-UE CLI aware beam failure detection and radio link management as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and N f may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

The wireless communications system 100 may support techniques for beam failure monitoring and radio link monitoring. A UE 115 may experience beam failure if radio conditions suddenly change. For example, if an end-user steps around a corner or a vehicle causes an obstruction between a network entity and the UE 115, existing beams may become unreliable before the UE 115 can switch to a different beam. Measurements for radio link monitoring (e.g., downlink measurements for radio link monitoring) may be performed via the physical layer via radio link monitoring reference signals. The measurement results may be passed to both MAC and RRC layers at the UE 115. RRC may detect radio link failure, while MAC may detect beam failure.

The physical layer may use a quality threshold to trigger failure indications to the MAC layer. For example, if monitored radio link monitoring reference signals satisfy a threshold, the MAC layer may trigger, detect, or generate a beam failure instance. The MAC layer may use these indications (e.g., in combination with a counter of beam failure instances and a beam failure detection timer) for beam failure detection. Once beam failure is detected, the UE 115 may attempt to recover the beam by initiating a random access channel procedure. For example, the UE 115 may perform a contention-free random access procedure with a configured beam failure recover information element. Before transmitting a random access channel preamble, the UE 115 may identify a new target beam by measuring candidate beams (e.g., by measuring a reference signal received power (RSRP) of candidate beams. The UE 115 may select a beam for the random access channel procedure for beam failure recovery based on the measurements.

The wireless communications system 100 may support full-duplex operations, where a device can transmit and receive simultaneously. For example, a network entity 105 may communicate in accordance with full-duplex operation, such as sub-band full duplex (SBFD) operation. With SBFD operation, the network entity 105 may simultaneously transmit downlink signaling and receive uplink signaling on a sub-band basis. For example, the network entity 105 may transmit a downlink message on a downlink sub-band and receive an uplink message on an uplink sub-band simultaneously. In some examples, SBFD operation may support an increased uplink duty cycle, providing latency reduction and uplink coverage enhancement. For example, the increased uplink duty cycle may enable a UE 115 to receive downlink signals in an uplink-only slot, improving latency reductions. SBFD may further enable flexible and dynamic uplink and downlink resource adaptation according to uplink and downlink traffic patterns.

In some examples, devices in the wireless communications system 100 may experience CLI, where reception at a first device is interfered by transmission from a second device. Systems implementing full-duplex operations may be especially susceptible to CLI, as downlink reception at a first UE may be affected by uplink transmission from a second UE (e.g., if the first UE and the second UE are communicating with a same network entity 105). However, CLI may occur from intra-cell scheduling as well (e.g., the first UE and the second UE are communicating with separate network entities 105 or separate serving cells).

In some examples, CLI may cause beam failure or radio link failure. For example, CLI may result in an abrupt change to channel conditions at the first UE 115, as the interference from the second UE 115 may cause the first UE 115 to be unable to receive downlink signaling. The wireless communications system 100, and wireless communications systems described herein, may support techniques for CLI detection and mitigation. In some examples, these techniques may support beam failure recovery or radio link recovery without having a UE 115 experiencing CLI perform a random access channel procedure.

For example, a network entity 105 may configure UEs 115 with an IMR for radio link monitoring or beam failure monitoring. A first UE 115 (e.g., a downlink receiving UE 115) may monitor the IMR to determine whether CLI is causing a beam failure. For example, a second UE 115 (e.g., an uplink transmitting UE 115) may transmit signaling to a network entity 105, which may affect downlink reception at the first UE 115. The second UE 115 may transmit reference signals on the IMR which may be received at the first UE 115. If the first UE 115 detects beam failure, the first UE 115 may determine whether CLI from the second UE 115 is causing, or contributing to, the beam failure based on the reference signals on the IMR. Based on the beam failure, the first UE 115 may transmit a beam failure report to the network entity 105. In some examples, the beam failure report may indicate that the beam failure is based on CLI or channel quality degradation, or both. For example, the beam failure report may indicate a reason for the beam failure.

If CLI causes the beam failure, the devices may implement techniques to perform beam recovery. For example, the network entity 105, the first UE 115, or the second UE 115, or any combination thereof, may implement techniques for a beam recovery without the first UE 115 performing a random access procedure. For example, the network entity 105 may configure a different scheduling configuration for the first UE 115 or the second UE 115, or both, such that the first UE 115 is not scheduled to receive downlink signaling while the second UE 115 is scheduled to transmit uplink signaling. Additionally, or alternatively, the network entity may configure a different downlink beam for the first UE 115 or a different uplink beam for the second UE 115. In some examples, the network entity may adjust a transmit power for the second UE 115 or adjust a transmit power of the network entity for the downlink signaling to the first UE 115 to reduce the effects of the CLI.

Figure 2:
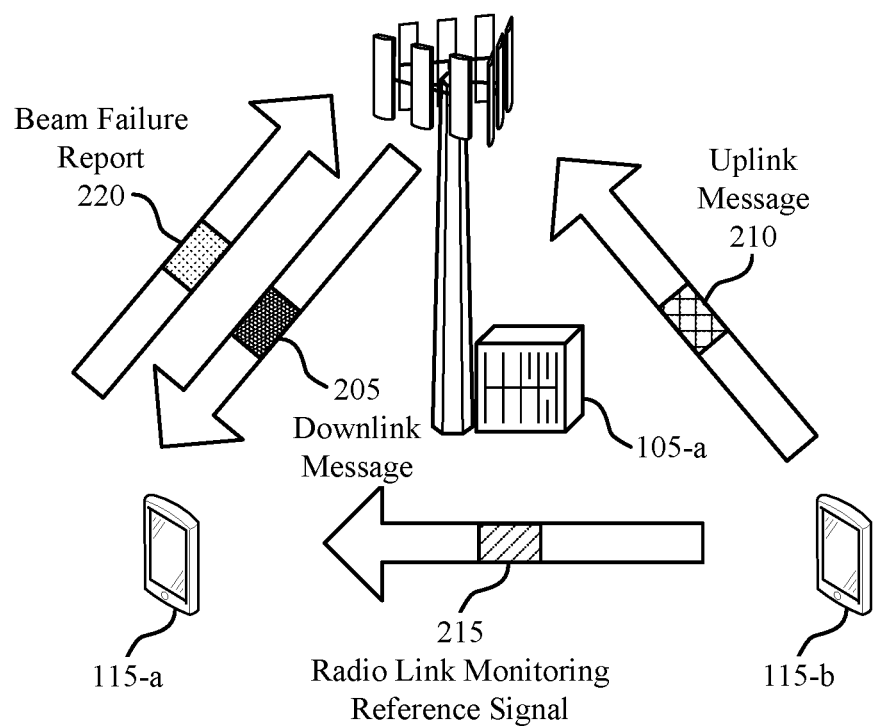
FIG. 2 illustrates an example of a wireless communications system that supports inter-UE CLI aware beam failure detection and radio link management in accordance with one or more aspects of the present disclosure.

FIG. 2 illustrates an example of a wireless communications system 200 that supports inter-UE CLI aware beam failure detection and radio link management in accordance with one or more aspects of the present disclosure. The wireless communications system 200 may include multiple UEs 115, including a UE 115-*a* and a UE 115-*b*, which may each be an example of a UE 115 as described with reference to FIG. 1. The wireless communications system 200 may include a network entity 105-*a*, which may be an example of a network entity 105 as described with reference to FIG. 1.

The wireless communications system 200 may support full duplex operation. For example, the network entity 105-*a* may communicate with the UE 115-*a* and the UE 115-*a* according to full duplex operation, such as SBFD. The network entity 105-*a* may transmit a downlink message 205 to the UE 115-*a* while receiving an uplink message 210 from the UE 115-*b*. In some examples, the transmission of the uplink message 210 from the UE 115-*b* may affect reception of the downlink message 205 at the UE 115-*a*. This may result in CLI, where signal propagation from transmitting the uplink message 210 interferes with reception of the downlink message 205 at the UE 115-*a*. While the wireless communications system 200 shows an example of CLI occurring in an inter-cell configuration, CLI may similarly occur in intra-cell configurations. For example, the UE 115-*b* may communicate with a different or a second network entity 105, and transmission from the UE 115-*b* to the second network entity 105 may cause CLI at the UE 115-*a*.

The wireless communications system 200 may support techniques to mitigate or detect CLI, such as if CLI causes beam failure or radio link failure at a UE 115. For example, the network entity 105-*a* may configure the UE 115-*a* or the UE 115-*b*, or both, with an IMR associated with radio link monitoring or beam failure monitoring. The network entity 105-*a* may transmit control signaling which configures transmission of an radio link monitoring reference signal 215 (e.g., an uplink radio link monitoring reference signal) as IMRs for beam failure detection or radio link monitoring, or both. In some examples, a sounding reference signal (SRS) may be an example of the radio link monitoring reference signal 215.

For example, the control signaling may indicate parameters for the IMRs at the UE 115-*a* and the UE 115-*b*. The control signaling may associate transmission of reference signals, such as the radio link monitoring reference signal 215, with interference measurement (e.g., CLI measurement) for radio link monitoring or beam failure detection, or both. In some examples, the control signaling may indicate parameters for the IMRs to configure resources for interference detection for radio link monitoring or beam failure detection, or both.

In some examples, the network entity 105-*a* may indicate parameters for the radio link monitoring IMRs with an radio link monitoring configuration. For example, the network entity 105-*a* may transmit an RRC message indicating parameters for an radio link monitoring configuration, such as via an radio link monitoring configuration information element. The radio link monitoring configuration may indicate parameters for radio link monitoring channel measurement resources (CMRs) or radio link monitoring IMRs, or both. For example, the parameters for the radio link monitoring IMRs may include an associated SRS resource identifier, an SRS subcarrier spacing, a starting physical resource block (PRB) of the IMRs, a quantity of PRBs for the IMRs, a starting position of the IMRs (e.g., in a radio frequency spectrum band), a quantity of symbols for the IMRs, an SRS periodicity and offset, quasi co-location information, a transmission configuration indicator (TCI) state identifier, or any combination thereof. In some examples, such as if the interfering UE is from a different serving cell, the parameters for the IMRs may include a serving cell identifier or a physical cell identifier of a cell serving the interfering UE or of the network entity 105-*a*, or both.

The UE 115-*a* may measure the radio link monitoring reference signals 215 from the UE 115-*b* over the IMRs. For example, the UE 115-*a* may measure an SRS transmitted by the UE 115-*b* over the IMRs to determine whether the UE 115-*b* is causing CLI at the UE 115-*a*. If, for example, a measurement of the radio link monitoring reference signals 215 satisfies a threshold, the UE 115-*a* may determine that the UE 115-*b* is causing CLI at the UE 115-*a*.

In some cases, the CLI from the UE 115-*b* may cause beam failure at the UE 115-*a*. For example, the interference from transmission of the uplink message 210 may result in a sudden change to radio conditions at the UE 115-*a*, causing beam failure. The UE 115-*a* may transmit a beam failure report 220 to the network entity 105-*a*.

In some examples, the beam failure report 220 may indicate a reason of the beam failure. For example, the beam failure report 220 may indicate whether the beam failure occurred due to detected CLI or due to channel quality reduction. For example, the beam failure report 220 may include a field for indicating the reason for beam failure. In some examples, a '1' in this field may indicate beam failure due to CLI, and a '0' may indicate beam failure due to channel quality reduction or channel quality degradation.

The network entity 105-*a* may receive the beam failure report 220 and identify the reason for the beam failure based on the beam failure report 220. The wireless communications system 200 may support techniques for beam recovery based on a beam failure due to CLI. For example, techniques for beam recovery in response to a beam failure due to CLI may be different from techniques for beam recovery in response to channel quality reduction.

For example, the network entity 105-*a* may transmit control signaling to configure different transmission parameters at the UE 115-*a* or the UE 115-*b*, or both. In some examples, the network entity 105-*a* may configure different downlink UEs or uplink UEs, or both. For example, the network entity 105-*a* may change scheduling information or a resource assignment for the UE 115-*a* or the UE 115-*b*, or both, such that transmission from the UE 115-*b* does not overlap (e.g., in time) with reception at the UE 115-*a*, avoiding future CLI. Additionally, or alternatively, the network entity 105-*a* may transmit the control signaling to switch beam sat the UE 115-*a* or the UE 115-*b*, or both. For example, the network entity 105-*a* may configure a different downlink beam for the UE 115-*a* or a different uplink beam for the UE 115-*b*, or both. In some examples, the network entity 105-*a* may adjust an uplink transmit power of the UE 115-*b*, which may reduce the impact of CLI on the UE 115-*a*. For example, the network entity 105-*a* may reduce a transmit power of the UE 115-*b* when transmitting uplink data messages to the network entity 105-*a* (e.g., during time slots that may overlap with downlink reception at the UE 115-*a*). In some examples, the network entity 105-*a* may adjust a downlink transmit power of the network entity 105-*a*. For example, the network entity 105-*a* may transmit to the UE 115-*a* using an increased transmit power, reducing a likelihood of the uplink transmission from the UE 115-*b* causing CLI at the UE 115-*a*.

These techniques may be implemented to identify and report whether CLI causes beam failure or radio link failure at a UE 115. Additionally, these techniques may support beam recovery when beam failure is caused by CLI, such as beam recovery techniques without performing a random access procedure.

Figure 3:
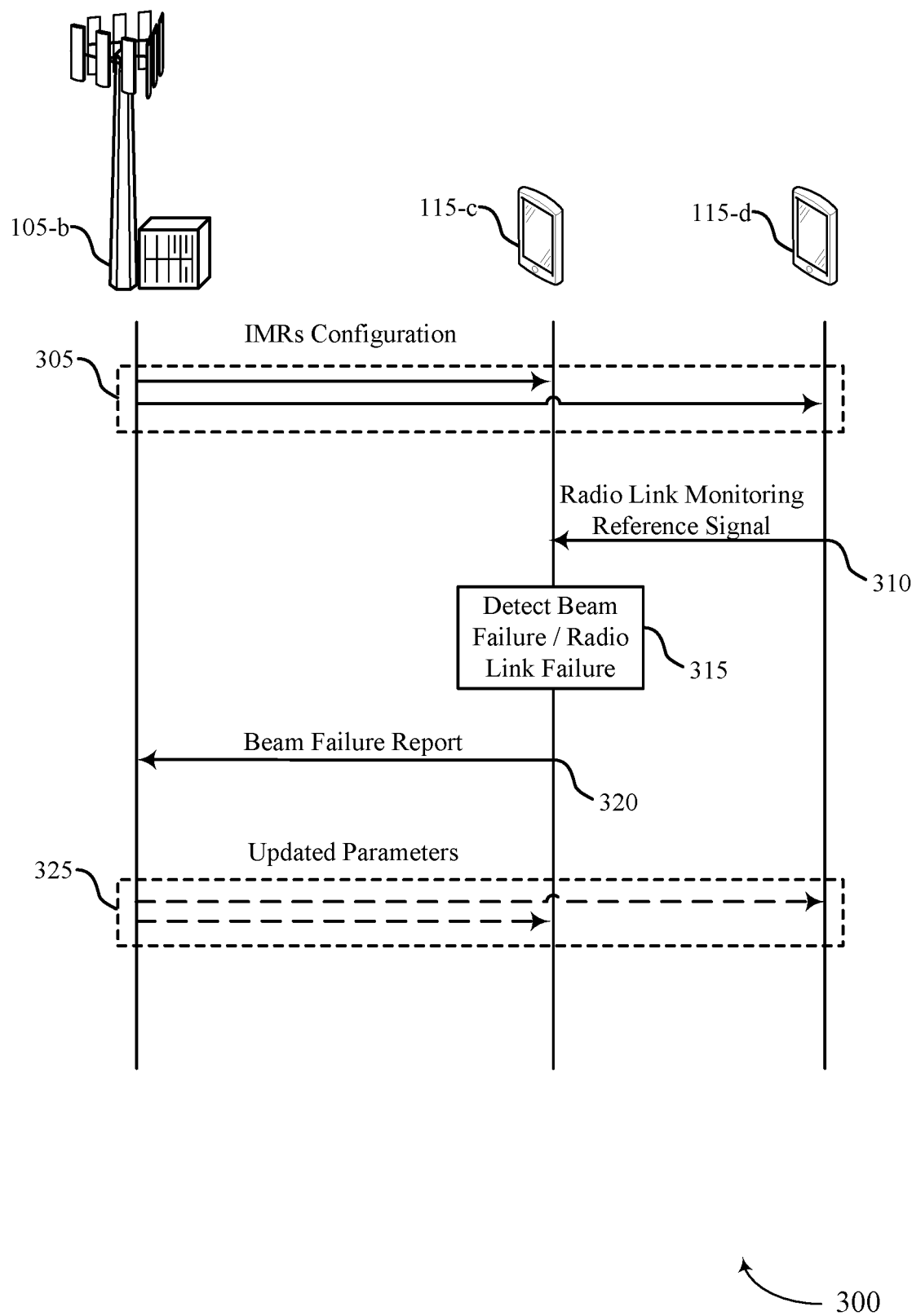
FIG. 3 illustrates an example of a process flow that supports inter-UE CLI aware beam failure detection and radio link management in accordance with one or more aspects of the present disclosure.

FIG. 3 illustrates an example of a process flow 300 that supports inter-UE CLI aware beam failure detection and radio link management in accordance with one or more aspects of the present disclosure. The process flow 300 may be implemented by a UE 115-*c*, a UE 115-*d*, or a network entity 105-*b*, or any combination thereof. The UE 115-*c* and the UE 115-*d* may each be an example of a UE 115 as described with reference to FIG. 1, and the network entity 105-*b* may be an example of a network entity 105 as described with reference to FIG. 1. In some examples, some signaling or procedures of the process flow 300 may occur in different orders than shown. Additionally, or alternatively, some signaling or procedures not shown may occur, or some signaling or procedures shown may not occur, or both.

The network entity 105-*b* may communicate in a full-duplex operation with the UE 115-*c* and the UE 115-*d*. For example, the network entity 105-*b* may transmit a downlink message to the UE 115-*c* and simultaneously receive an uplink message from the UE 115-*d*. In some examples, the transmission of the uplink message may cause CLI at the UE 115-*c*. In some other examples, the UE 115-*c* may experience intra-cell CLI, such as from a UE 115 communicating with a different network entity 105.

At 305, the network entity 105-*b* may transmit control signaling configuring one or more IMRs at the UE 115-*a* or the UE 115-*b*, or both. For example, the UE 115-*a* may receive a control message indicating a set of IMRs for reference signal transmission associated with radio link monitoring or beam failure monitoring, or both. In an example, the control message may indicate parameters for the IMRs, such as a subcarrier spacing, a quantity of physical resource blocks, a starting physical resource block, a starting position, a quantity of symbols, a transmission configuration indicator state, or any combination thereof, for the set of IMRs.

The UE 115-*c* may monitor the set of IMRs for radio link monitoring reference signals based on the control message. At 310, the UE 115-*c* may receive, from the UE 115-*d* via the set of IMRs, one or more reference signals associated with radio link monitoring or beam failure monitoring based on the control message. For example, the UE 115-*d* may transmit radio link monitoring reference signals on the set of IMRs, and the UE 115-*c* may measure the radio link monitoring reference signals. If measurements for the one or more reference signals satisfy a threshold (e.g., have an RSRP measurement higher than a threshold), the UE 115-*c* may detect CLI.

In some examples, the CLI from the UE 115-*d* may affect channel conditions or link conditions at the UE 115-*c*. For example, at 315, the UE 115-*c* may detect a beam failure or a radio link failure, or both. In some cases, the interference from the UE 115-*d* transmitting may cause beam failure or radio link failure at the UE 115-*c* due to abrupt changes to channel conditions.

At 320, the UE 115-*c* may transmit a beam failure report to the network entity 105-*b*. For example, the UE 115-*c* may transmit, in response to receiving the one or more reference signals, the beam failure report associated with the radio link monitoring or the beam failure monitoring based on the one or more measurements of the one or more reference signals. In some examples, the beam failure report may indicate a reason for the beam failure or radio link failure. In some examples, the beam failure report may indicate CLI from the UE 115-*d* based on the one or more measurements for the one or more reference signals. The beam failure report may indicate that beam failure occurred or radio link failure occurred based on CLI from the UE 115-*d* or a channel quality reduction, or both.

At 325, the network entity 105-*b* may transmit updated transmission parameters to the UE 115-*c* or the UE 115-*d*, or both. For example, beam recovery based on CLI may include different procedures than beam recovery based on channel quality reduction. In an example, the UE 115-*c* may receive, in response to the beam failure report, a second control message indicating a transmit power parameter, a transmit beam parameter, a resource assignment, or any combination thereof. In some examples, the network entity 105-*b* may configure a different downlink UE 115 or a different uplink UE 115. For example, the network entity 105-*b* may change scheduling for the UE 115-*c* or the UE 115-*d*, or both, such that the UE 115-*c* does not receive at a same time that the UE 115-*d* transmits. In some examples, the network entity 105-*b* may configure a different downlink reception beam for the UE 115-*c* or configure a different uplink transmit beam for the UE 115-*d*, or both. In some examples, the network entity 105-*b* may configure a different uplink transmit power for the UE 115-*d* or adjust a downlink transmit power for the network entity 105-*b*, or both.

Figure 4:
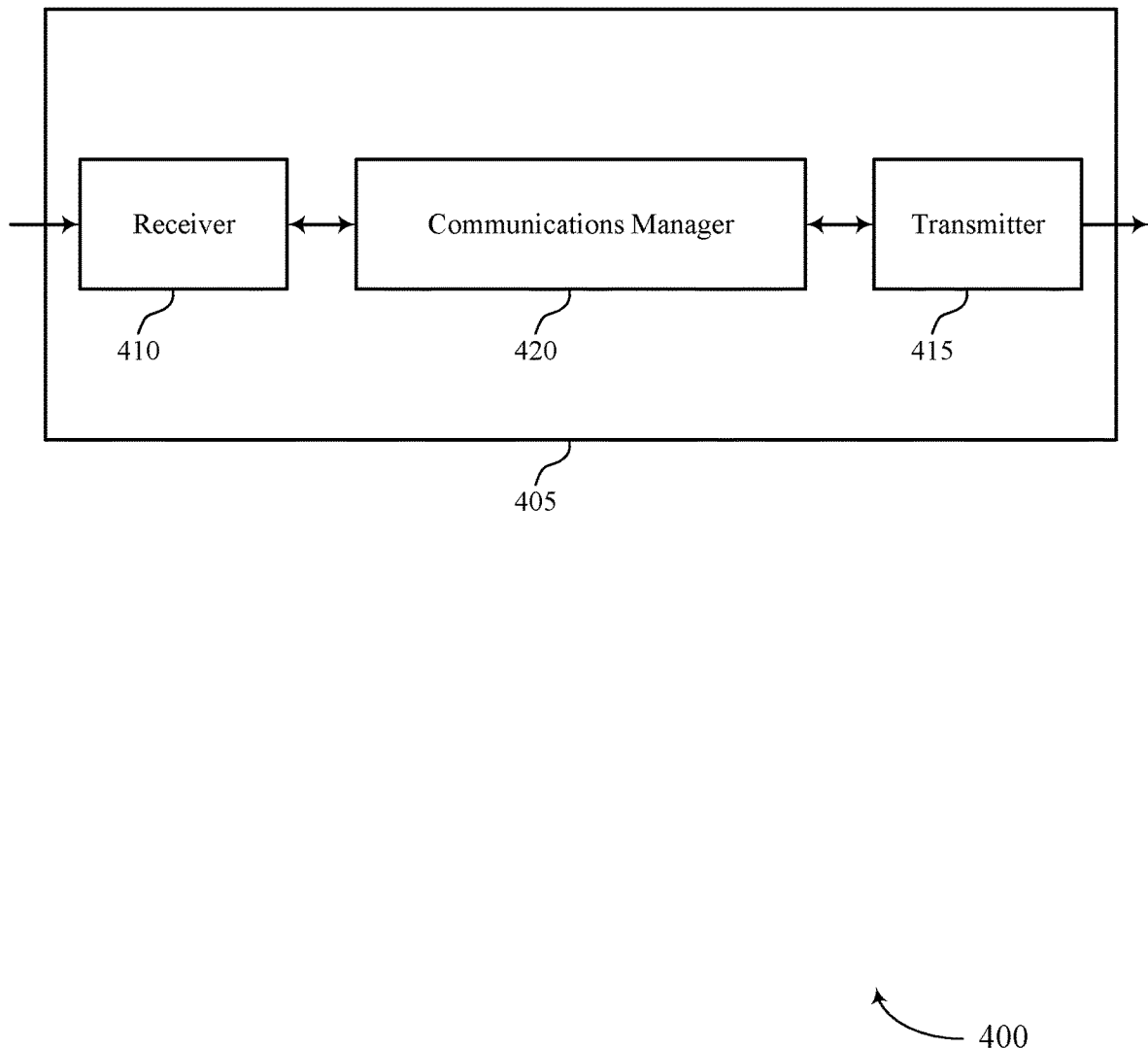
FIGS. 4 and 5 show block diagrams of devices that support inter-UE CLI aware beam failure detection and radio link management in accordance with one or more aspects of the present disclosure.

FIG. 4 shows a block diagram 400 of a device 405 that supports inter-UE CLI aware beam failure detection and radio link management in accordance with one or more aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to inter-UE CLI aware beam failure detection and radio link management). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to inter-UE CLI aware beam failure detection and radio link management). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of inter-UE CLI aware beam failure detection and radio link management as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communications at a first UE in accordance with examples as disclosed herein. For example, the communications manager 420 may be configured as or otherwise support a means for receiving a control message indicating a set of IMRs for reference signal transmission associated with radio link monitoring or beam failure monitoring. The communications manager 420 may be configured as or otherwise support a means for receiving, from a second UE via the set of IMRs, one or more reference signals associated with radio link monitoring or beam failure monitoring based on the control message. The communications manager 420 may be configured as or otherwise support a means for transmitting, in response to receiving the one or more reference signals, a beam failure report associated with the radio link monitoring or the beam failure monitoring based on one or more measurements of the one or more reference signals.

Additionally, or alternatively, the communications manager 420 may support wireless communications at a second UE in accordance with examples as disclosed herein. For example, the communications manager 420 may be configured as or otherwise support a means for receiving a control message indicating a set of IMRs for reference signal transmission associated with radio link monitoring or beam failure monitoring. The communications manager 420 may be configured as or otherwise support a means for transmitting, via the set of IMRs, one or more reference signals in response to the control message.

By including or configuring the communications manager 420 in accordance with examples as described herein, the device 405 (e.g., a processor controlling or otherwise coupled with the receiver 410, the transmitter 415, the communications manager 420, or a combination thereof) may support techniques for reduced power consumption and faster beam recovery. For example, by indicating that CLI is impacting a beam failure or radio link failure, the device 405 may be configured with updated parameters to prevent CLI and recover from beam failure or radio link failure without performing a random access channel procedure.

Figure 5:
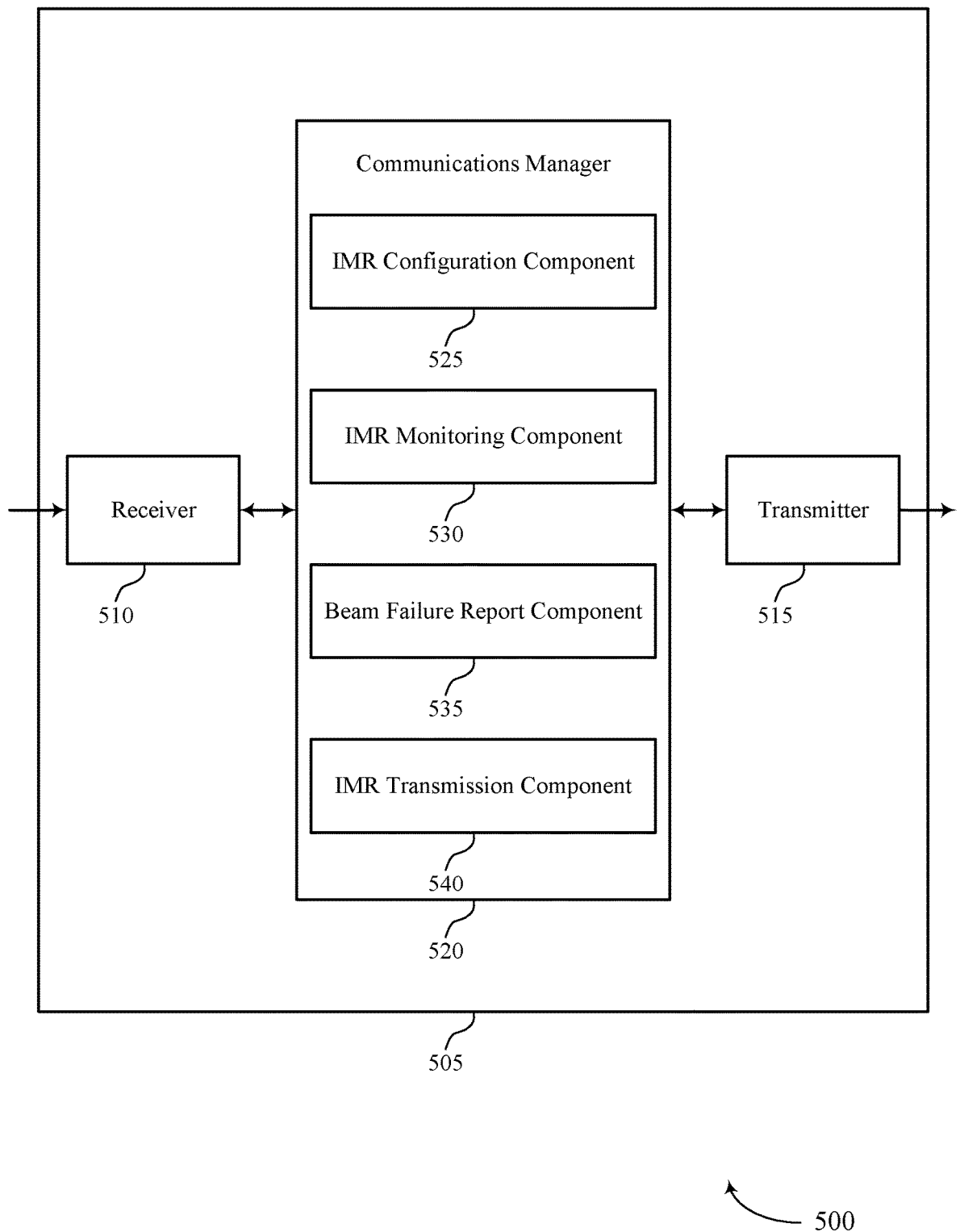

FIG. 5 shows a block diagram 500 of a device 505 that supports inter-UE CLI aware beam failure detection and radio link management in accordance with one or more aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to inter-UE CLI aware beam failure detection and radio link management). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to inter-UE CLI aware beam failure detection and radio link management). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of inter-UE CLI aware beam failure detection and radio link management as described herein. For example, the communications manager 520 may include an IMR configuration component 525, an IMR monitoring component 530, a beam failure report component 535, an IMR transmission component 540, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a first UE in accordance with examples as disclosed herein. The IMR configuration component 525 may be configured as or otherwise support a means for receiving a control message indicating a set of IMRs for reference signal transmission associated with radio link monitoring or beam failure monitoring. The IMR monitoring component 530 may be configured as or otherwise support a means for receiving, from a second UE via the set of IMRs, one or more reference signals associated with radio link monitoring or beam failure monitoring based on the control message. The beam failure report component 535 may be configured as or otherwise support a means for transmitting, in response to receiving the one or more reference signals, a beam failure report associated with the radio link monitoring or the beam failure monitoring based on one or more measurements of the one or more reference signals.

Additionally, or alternatively, the communications manager 520 may support wireless communications at a second UE in accordance with examples as disclosed herein. The IMR configuration component 525 may be configured as or otherwise support a means for receiving a control message indicating a set of IMRs for reference signal transmission associated with radio link monitoring or beam failure monitoring. The IMR transmission component 540 may be configured as or otherwise support a means for transmitting, via the set of IMRs, one or more reference signals in response to the control message.

Figure 6:
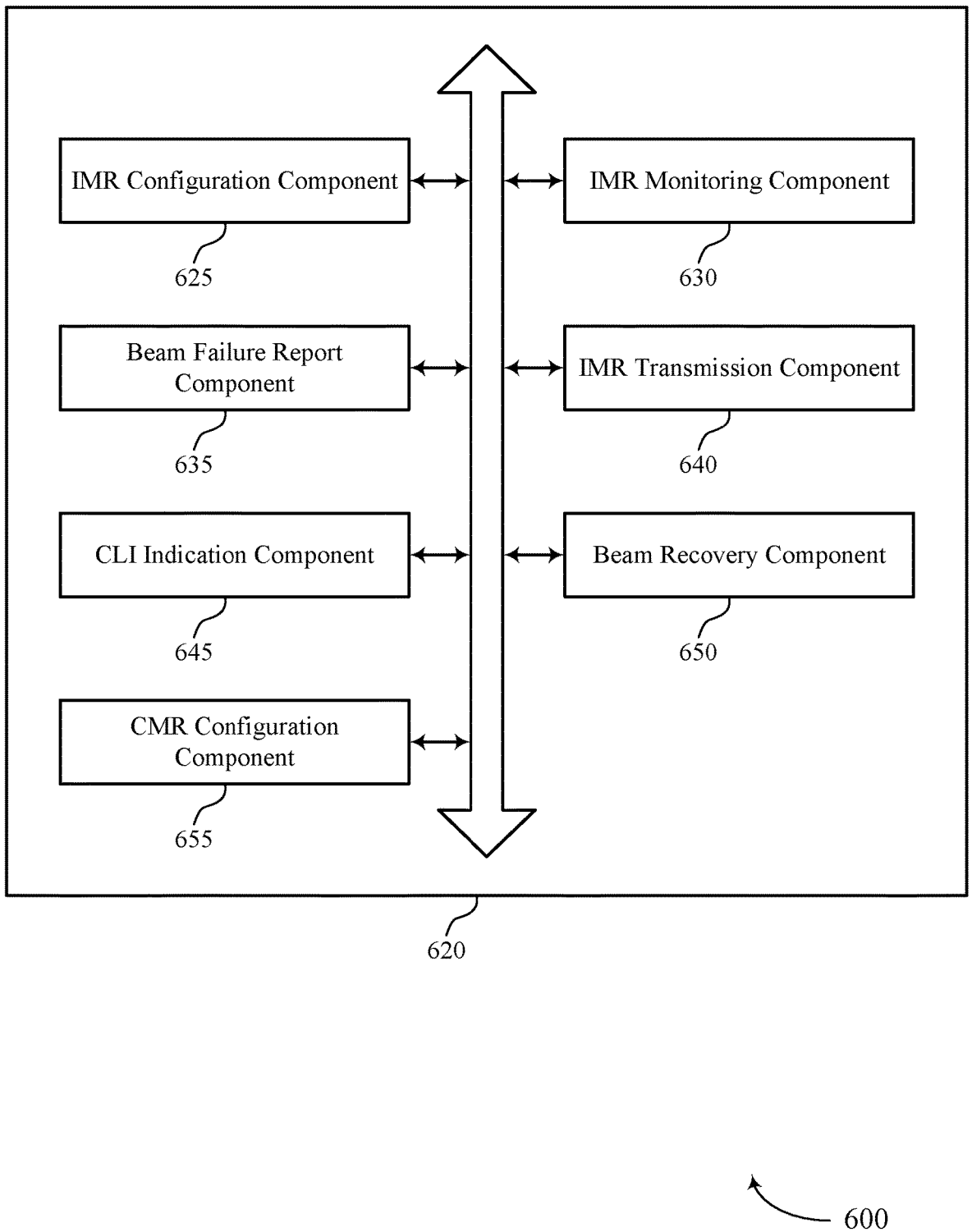
FIG. 6 shows a block diagram of a communications manager that supports inter-UE CLI aware beam failure detection and radio link management in accordance with one or more aspects of the present disclosure.

FIG. 6 shows a block diagram 600 of a communications manager 620 that supports inter-UE CLI aware beam failure detection and radio link management in accordance with one or more aspects of the present disclosure. The communications manager 620 may be an example of aspects of a communications manager 420, a communications manager 520, or both, as described herein. The communications manager 620, or various components thereof, may be an example of means for performing various aspects of inter-UE CLI aware beam failure detection and radio link management as described herein. For example, the communications manager 620 may include an IMR configuration component 625, an IMR monitoring component 630, a beam failure report component 635, an IMR transmission component 640, a CLI indication component 645, a beam recovery component 650, an CMR configuration component 655, or any combination thereof. Each of these components may communicate, directly or indirectly, with one another (e.g., via one or more buses).

The communications manager 620 may support wireless communications at a first UE in accordance with examples as disclosed herein. The IMR configuration component 625 may be configured as or otherwise support a means for receiving a control message indicating a set of IMRs for reference signal transmission associated with radio link monitoring or beam failure monitoring. The IMR monitoring component 630 may be configured as or otherwise support a means for receiving, from a second UE via the set of IMRs, one or more reference signals associated with radio link monitoring or beam failure monitoring based on the control message. The beam failure report component 635 may be configured as or otherwise support a means for transmitting, in response to receiving the one or more reference signals, a beam failure report associated with the radio link monitoring or the beam failure monitoring based on one or more measurements of the one or more reference signals.

In some examples, to support transmitting the beam failure report, the CLI indication component 645 may be configured as or otherwise support a means for transmitting the beam failure report indicating CLI from the second UE based on measuring the one or more reference signals.

In some examples, to support transmitting the beam failure report, the beam failure report component 635 may be configured as or otherwise support a means for transmitting the beam failure report indicating a beam failure detection based on measuring the one or more reference signals.

In some examples, to support transmitting the beam failure report, the beam failure report component 635 may be configured as or otherwise support a means for transmitting the beam failure report indicating a radio link failure based on measuring the one or more reference signals.

In some examples, to support transmitting the beam failure report, the CLI indication component 645 may be configured as or otherwise support a means for transmitting the beam failure report indicating a beam failure occurred based on a CLI from the second UE or a channel quality reduction, or both.

In some examples, the beam recovery component 650 may be configured as or otherwise support a means for receiving, in response to the beam failure report, a second control message indicating a transmit power parameter, a transmit beam parameter, a resource assignment, or any combination thereof.

In some examples, to support receiving the control message, the IMR monitoring component 630 may be configured as or otherwise support a means for receiving the control message indicating a sounding reference signal resource identifier, where the one or more reference signals from the second UE are one or more sounding reference signals.

In some examples, to support receiving the control message, the IMR configuration component 625 may be configured as or otherwise support a means for receiving the control message indicating a subcarrier spacing, a quantity of physical resource blocks, a starting physical resource block, a starting position, a quantity of symbols, a transmission configuration indicator state, or any combination thereof, for the set of IMRs.

In some examples, to support receiving the control message, the IMR configuration component 625 may be configured as or otherwise support a means for receiving the control message indicating a serving cell identifier or a physical cell identifier for a serving cell of the second UE, where the serving cell of the second UE is different from a network entity serving the first UE.

In some examples, to support receiving the control message, the CMR configuration component 655 may be configured as or otherwise support a means for receiving the control message indicating a set of channel measurement resources for second reference signal transmission associated with the radio link monitoring or the beam failure monitoring. In some examples, to support receiving the control message, the CMR configuration component 655 may be configured as or otherwise support a means for receiving, via the set of channel measurement resources, one or more second reference signals based on the control message. In some examples, to support receiving the control message, the CMR configuration component 655 may be configured as or otherwise support a means for transmitting a measurement report based on measuring the one or more second reference signals.

Additionally, or alternatively, the communications manager 620 may support wireless communications at a second UE in accordance with examples as disclosed herein. In some examples, the IMR configuration component 625 may be configured as or otherwise support a means for receiving a control message indicating a set of IMRs for reference signal transmission associated with radio link monitoring or beam failure monitoring. The IMR transmission component 640 may be configured as or otherwise support a means for transmitting, via the set of IMRs, one or more reference signals in response to the control message.

In some examples, the beam recovery component 650 may be configured as or otherwise support a means for receiving a second control message indicating a transmit power parameter, a transmit beam parameter, a resource assignment, or any combination thereof.

In some examples, to support receiving the control message, the IMR configuration component 625 may be configured as or otherwise support a means for receiving the control message indicating a sounding reference signal resource identifier, where the one or more reference signals are one or more sounding reference signals.

In some examples, to support receiving the control message, the IMR configuration component 625 may be configured as or otherwise support a means for receiving the control message indicating a subcarrier spacing, a quantity of physical resource blocks, a starting physical resource block, a starting position, a quantity of symbols, a transmission configuration indicator state, or any combination thereof, for the set of IMRs.

Figure 7:
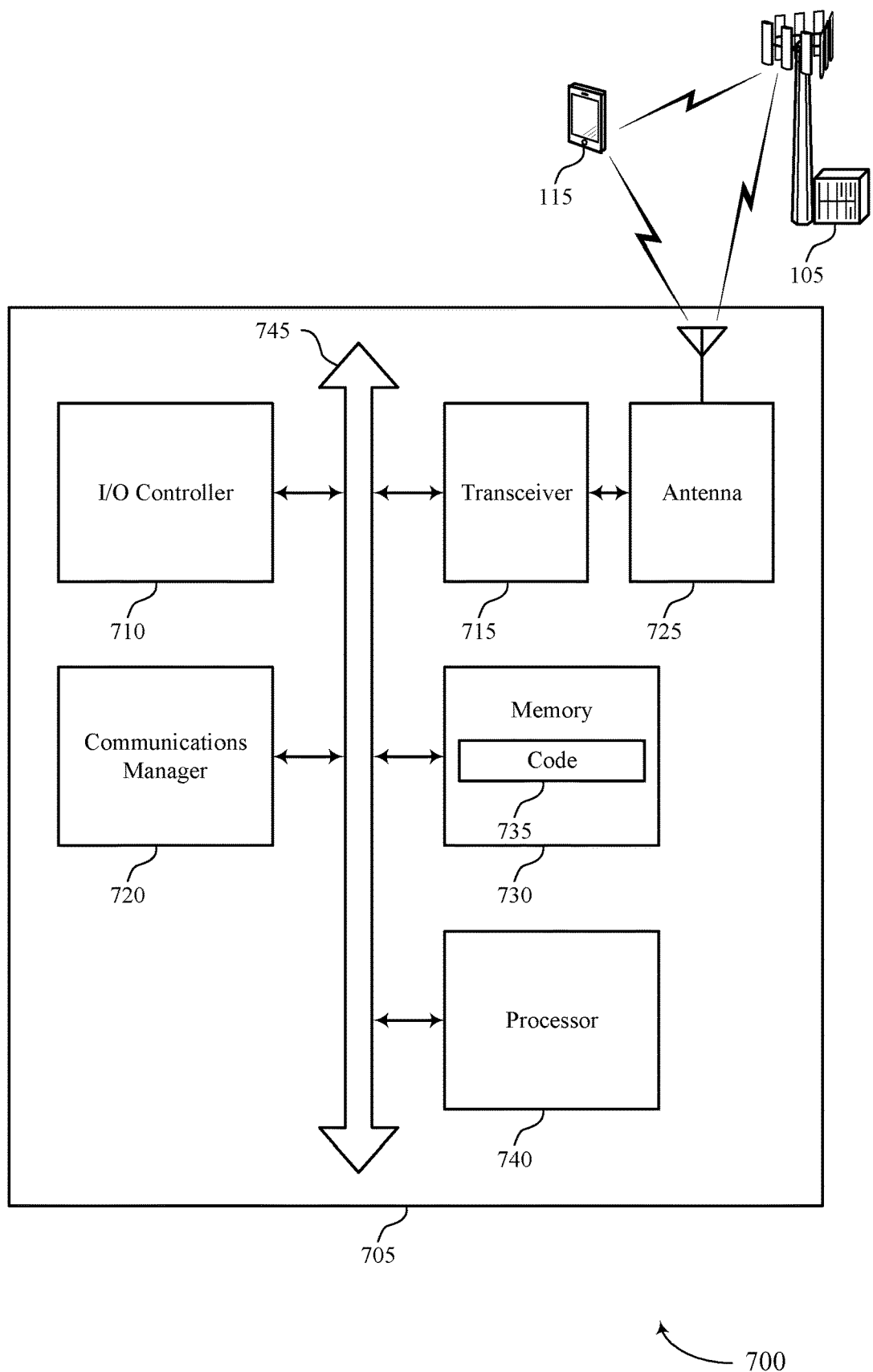
FIG. 7 shows a diagram of a system including a device that supports inter-UE CLI aware beam failure detection and radio link management in accordance with one or more aspects of the present disclosure.

FIG. 7 shows a diagram of a system 700 including a device 705 that supports inter-UE CLI aware beam failure detection and radio link management in accordance with one or more aspects of the present disclosure. The device 705 may be an example of or include the components of a device 405, a device 505, or a UE 115 as described herein. The device 705 may communicate (e.g., wirelessly) with one or more network entities 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting inter-UE CLI aware beam failure detection and radio link management). For example, the device 705 or a component of the device 705 may include a processor 740 and memory 730 coupled with or to the processor 740, the processor 740 and memory 730 configured to perform various functions described herein.

The communications manager 720 may support wireless communications at a first UE in accordance with examples as disclosed herein. For example, the communications manager 720 may be configured as or otherwise support a means for receiving a control message indicating a set of IMRs for reference signal transmission associated with radio link monitoring or beam failure monitoring. The communications manager 720 may be configured as or otherwise support a means for receiving, from a second UE via the set of IMRs, one or more reference signals associated with radio link monitoring or beam failure monitoring based on the control message. The communications manager 720 may be configured as or otherwise support a means for transmitting, in response to receiving the one or more reference signals, a beam failure report associated with the radio link monitoring or the beam failure monitoring based on one or more measurements of the one or more reference signals.

Additionally, or alternatively, the communications manager 720 may support wireless communications at a second UE in accordance with examples as disclosed herein. For example, the communications manager 720 may be configured as or otherwise support a means for receiving a control message indicating a set of IMRs for reference signal transmission associated with radio link monitoring or beam failure monitoring. The communications manager 720 may be configured as or otherwise support a means for transmitting, via the set of IMRs, one or more reference signals in response to the control message.

By including or configuring the communications manager 720 in accordance with examples as described herein, the device 705 may support techniques for reduced power consumption and faster beam recovery. For example, by indicating that CLI is impacting a beam failure or radio link failure, the device 705 may be configured with updated parameters to prevent CLI and recover from beam failure or radio link failure without performing a random access channel procedure.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of inter-UE CLI aware beam failure detection and radio link management as described herein, or the processor 740 and the memory 730 may be otherwise configured to perform or support such operations.

Figure 8:
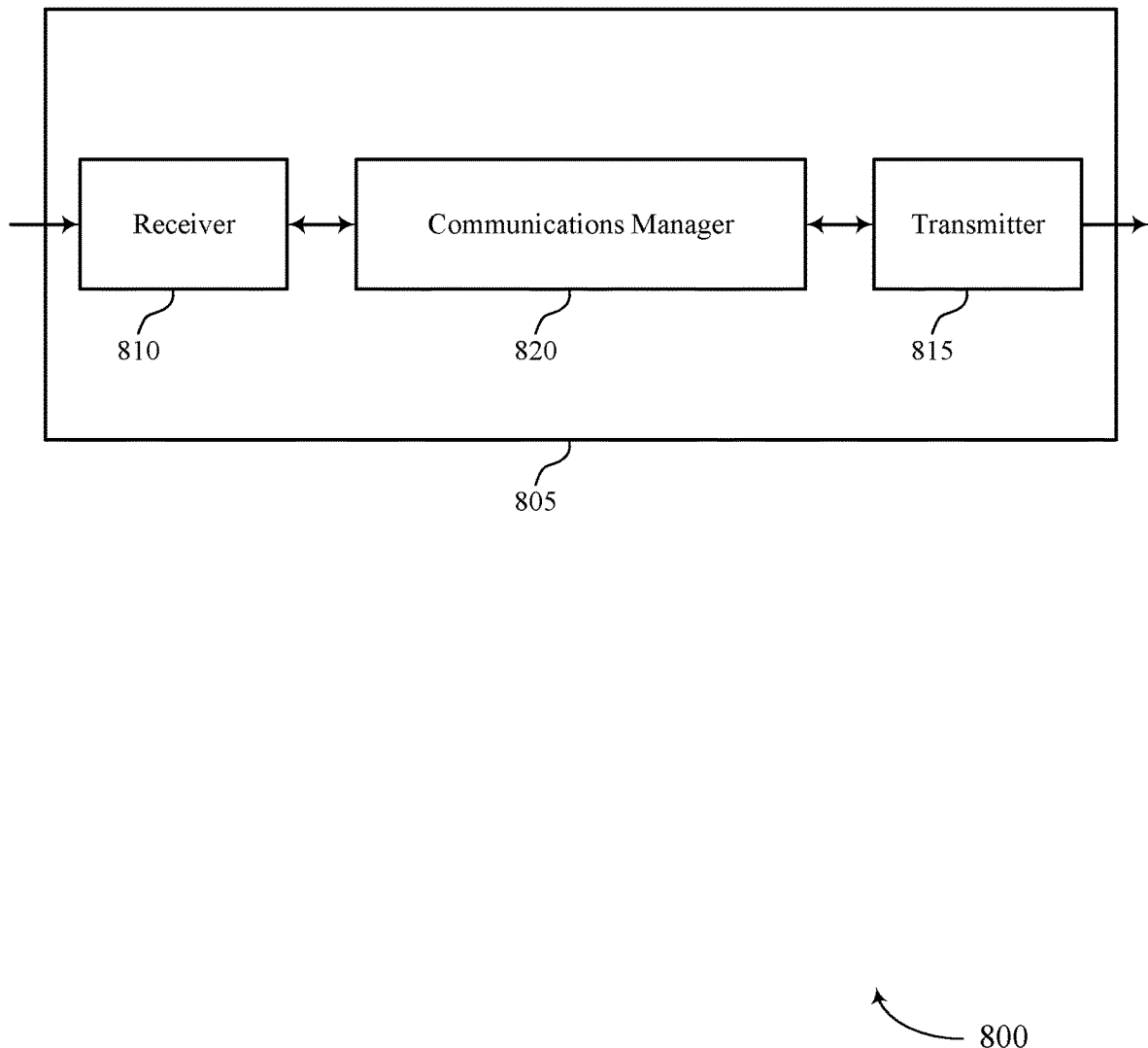
FIGS. 8 and 9 show block diagrams of devices that support inter-UE CLI aware beam failure detection and radio link management in accordance with one or more aspects of the present disclosure.

FIG. 8 shows a block diagram 800 of a device 805 that supports inter-UE CLI aware beam failure detection and radio link management in accordance with one or more aspects of the present disclosure. The device 805 may be an example of aspects of a network entity 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations thereof or various components thereof may be examples of means for performing various aspects of inter-UE CLI aware beam failure detection and radio link management as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a network entity in accordance with examples as disclosed herein. For example, the communications manager 820 may be configured as or otherwise support a means for transmitting, to a first UE, a first control message indicating a set of IMRs associated with radio link monitoring or beam failure monitoring for reference signal transmission from a second UE. The communications manager 820 may be configured as or otherwise support a means for receiving, from the first UE, a beam failure report based on the set of IMRs. The communications manager 820 may be configured as or otherwise support a means for transmitting, in response the beam failure report, a second control message indicating a set of parameters for beam failure recovery.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for reduced power consumption and faster beam recovery for a UE 115 that is experiencing beam failure or radio link failure. For example, by determining that CLI is impacting or causing a beam failure or radio link failure, the device 805 may be configure interfering UEs 115 with updated parameters. The updated parameters may prevent CLI, and a UE 115 experiencing beam failure or radio link failure may recover the beam or radio link without performing a random access channel procedure.

Figure 9:
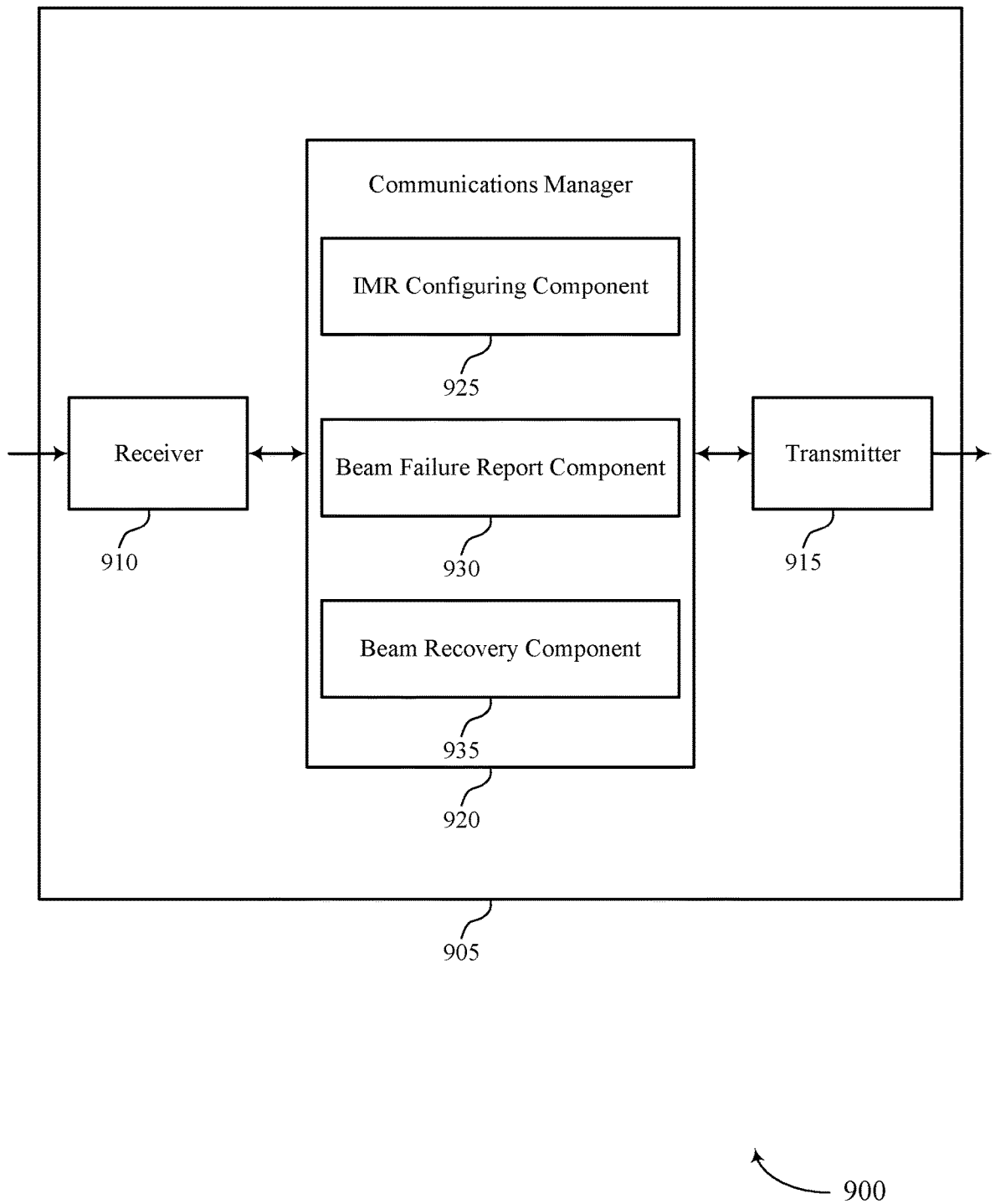

FIG. 9 shows a block diagram 900 of a device 905 that supports inter-UE CLI aware beam failure detection and radio link management in accordance with one or more aspects of the present disclosure. The device 905 may be an example of aspects of a device 805 or a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of inter-UE CLI aware beam failure detection and radio link management as described herein. For example, the communications manager 920 may include an IMR configuring component 925, a beam failure report component 930, a beam recovery component 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a network entity in accordance with examples as disclosed herein. The IMR configuring component 925 may be configured as or otherwise support a means for transmitting, to a first UE, a first control message indicating a set of IMRs associated with radio link monitoring or beam failure monitoring for reference signal transmission from a second UE. The beam failure report component 930 may be configured as or otherwise support a means for receiving, from the first UE, a beam failure report based on the set of IMRs. The beam recovery component 935 may be configured as or otherwise support a means for transmitting, in response the beam failure report, a second control message indicating a set of parameters for beam failure recovery.

Figure 10:
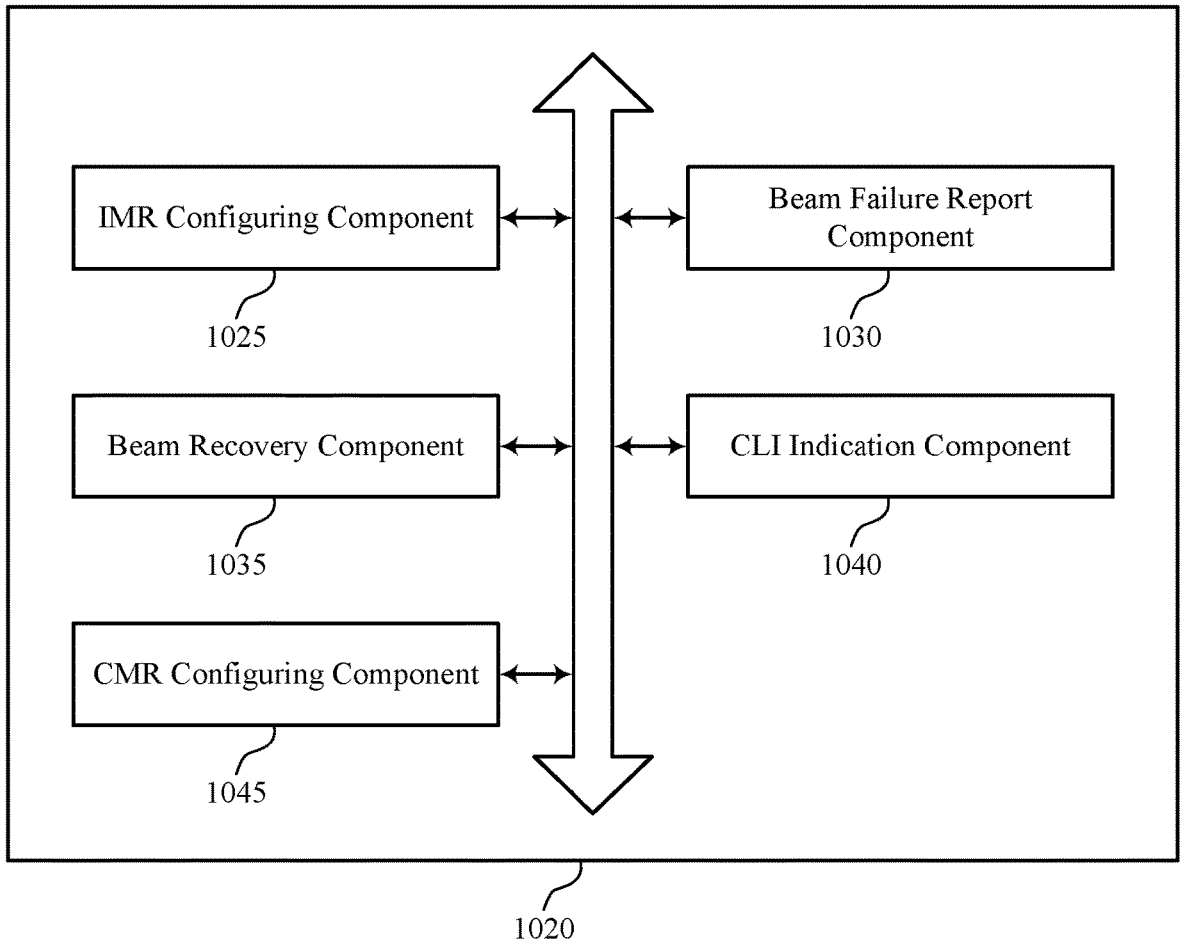
FIG. 10 shows a block diagram of a communications manager that supports inter-UE CLI aware beam failure detection and radio link management in accordance with one or more aspects of the present disclosure.

FIG. 10 shows a block diagram 1000 of a communications manager 1020 that supports inter-UE CLI aware beam failure detection and radio link management in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of inter-UE CLI aware beam failure detection and radio link management as described herein. For example, the communications manager 1020 may include an IMR configuring component 1025, a beam failure report component 1030, a beam recovery component 1035, a CLI indication component 1040, an CMR configuring component 1045, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1020 may support wireless communications at a network entity in accordance with examples as disclosed herein. The IMR configuring component 1025 may be configured as or otherwise support a means for transmitting, to a first UE, a first control message indicating a set of IMRs associated with radio link monitoring or beam failure monitoring for reference signal transmission from a second UE. The beam failure report component 1030 may be configured as or otherwise support a means for receiving, from the first UE, a beam failure report based on the set of IMRs. The beam recovery component 1035 may be configured as or otherwise support a means for transmitting, in response the beam failure report, a second control message indicating a set of parameters for beam failure recovery.

In some examples, to support receiving the beam failure report, the CLI indication component 1040 may be configured as or otherwise support a means for receiving the beam failure report indicating CLI from the second UE.

In some examples, to support receiving the beam failure report, the beam failure report component 1030 may be configured as or otherwise support a means for receiving the beam failure report indicating a beam failure detection based on the set of IMRs.

In some examples, to support receiving the beam failure report, the beam failure report component 1030 may be configured as or otherwise support a means for receiving the beam failure report indicating a radio link failure based on the set of IMRs.

In some examples, to support receiving the beam failure report, the CLI indication component 1040 may be configured as or otherwise support a means for receiving the beam failure report indicating a beam failure occurred based on a CLI from the second UE or a channel quality reduction, or both.

In some examples, to support transmitting the second control message, the beam recovery component 1035 may be configured as or otherwise support a means for transmitting the second control message to the first UE or the second UE, or both, indicating a transmit power parameter, a transmit beam parameter, a resource assignment, or any combination thereof.

In some examples, to support transmitting the first control message, the IMR configuring component 1025 may be configured as or otherwise support a means for transmitting the first control message indicating a sounding reference signal resource identifier, where the reference signal transmission is sounding reference signal transmission.

In some examples, to support transmitting the first control message, the IMR configuring component 1025 may be configured as or otherwise support a means for transmitting the first control message indicating a subcarrier spacing, a quantity of physical resource blocks, a starting physical resource block, a starting position, a quantity of symbols, a transmission configuration indicator state, or any combination thereof, for the set of IMRs.

In some examples, to support transmitting the first control message, the IMR configuring component 1025 may be configured as or otherwise support a means for transmitting the first control message indicating a serving cell identifier or a physical cell identifier for a serving cell of the second UE, where the serving cell of the second UE is different from the network entity.

In some examples, to support transmitting the first control message, the CMR configuring component 1045 may be configured as or otherwise support a means for transmitting the first control message indicating a set of channel measurement resources for second reference signal transmission associated with the radio link monitoring or the beam failure monitoring. In some examples, to support transmitting the first control message, the CMR configuring component 1045 may be configured as or otherwise support a means for transmitting, to the first UE, one or more reference signals via the set of channel measurement resources based on the first control message. In some examples, to support transmitting the first control message, the CMR configuring component 1045 may be configured as or otherwise support a means for receiving a second measurement report from the first UE indicating measurements for the one or more reference signals.

Figure 11:
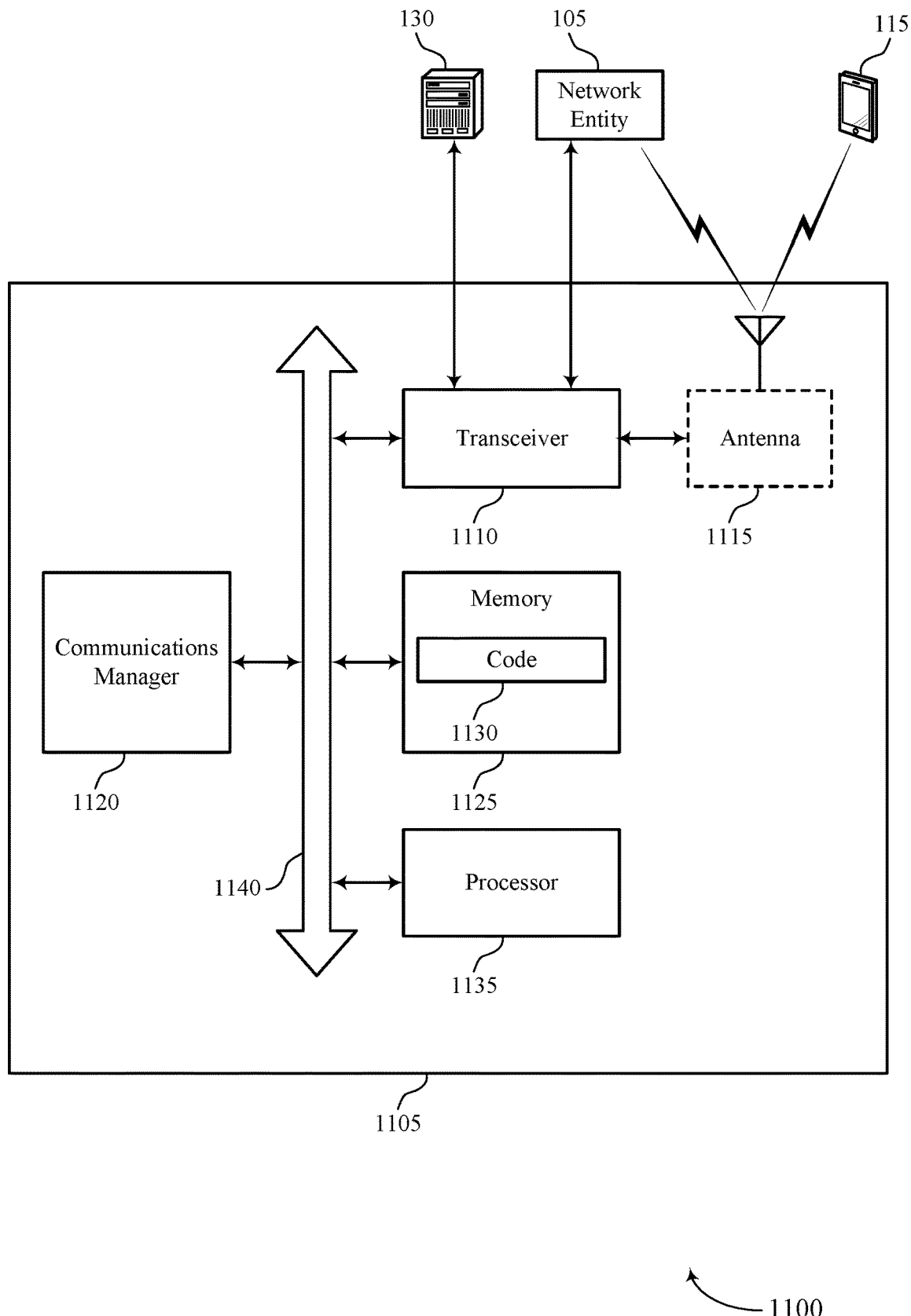
FIG. 11 shows a diagram of a system including a device that supports inter-UE CLI aware beam failure detection and radio link management in accordance with one or more aspects of the present disclosure.

FIG. 11 shows a diagram of a system 1100 including a device 1105 that supports inter-UE CLI aware beam failure detection and radio link management in accordance with one or more aspects of the present disclosure. The device 1105 may be an example of or include the components of a device 805, a device 905, or a network entity 105 as described herein. The device 1105 may communicate with one or more network entities 105, one or more UEs 115, or any combination thereof, which may include communications over one or more wired interfaces, over one or more wireless interfaces, or any combination thereof. The device 1105 may include components that support outputting and obtaining communications, such as a communications manager 1120, a transceiver 1110, an antenna 1115, a memory 1125, code 1130, and a processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. In some implementations, the transceiver 1110 may include one or more interfaces, such as one or more interfaces coupled with the one or more antennas 1115 that are configured to support various receiving or obtaining operations, or one or more interfaces coupled with the one or more antennas 1115 that are configured to support various transmitting or outputting operations, or a combination thereof. In some implementations, the transceiver 1110 may include or be configured for coupling with one or more processors or memory components that are operable to perform or support operations based on received or obtained information or signals, or to generate information or other signals for transmission or other outputting, or any combination thereof. In some implementations, the transceiver 1110, or the transceiver 1110 and the one or more antennas 1115, or the transceiver 1110 and the one or more antennas 1115 and one or more processors or memory components (for example, the processor 1135, or the memory 1125, or both), may be included in a chip or chip assembly that is installed in the device 1105. In some examples, the transceiver may be operable to support communications via one or more communications links (e.g., a communication link 125, a backhaul communication link 120, a midhaul communication link 162, a fronthaul communication link 168).

The memory 1125 may include RAM and ROM. The memory 1125 may store computer-readable, computer-executable code 1130 including instructions that, when executed by the processor 1135, cause the device 1105 to perform various functions described herein. The code 1130 may be stored in a non-transitory computer-readable medium such as system memory or another type of memory. In some cases, the code 1130 may not be directly executable by the processor 1135 but may cause a computer (e.g., when compiled and executed) to perform functions described herein. In some cases, the memory 1125 may contain, among other things, a BIOS which may control basic hardware or software operation such as the interaction with peripheral components or devices.

The processor 1135 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1135 may be configured to operate a memory array using a memory controller. In some other cases, a memory controller may be integrated into the processor 1135. The processor 1135 may be configured to execute computer-readable instructions stored in a memory (e.g., the memory 1125) to cause the device 1105 to perform various functions (e.g., functions or tasks supporting inter-UE CLI aware beam failure detection and radio link management). For example, the device 1105 or a component of the device 1105 may include a processor 1135 and memory 1125 coupled with the processor 1135, the processor 1135 and memory 1125 configured to perform various functions described herein. The processor 1135 may be an example of a cloud-computing platform (e.g., one or more physical nodes and supporting software such as operating systems, virtual machines, or container instances) that may host the functions (e.g., by executing code 1130) to perform the functions of the device 1105. The processor 1135 may be any one or more suitable processors capable of executing scripts or instructions of one or more software programs stored in the device 1105 (such as within the memory 1125). In some implementations, the processor 1135 may be a component of a processing system. A processing system may generally refer to a system or series of machines or components that receives inputs and processes the inputs to produce a set of outputs (which may be passed to other systems or components of, for example, the device 1105). For example, a processing system of the device 1105 may refer to a system including the various other components or subcomponents of the device 1105, such as the processor 1135, or the transceiver 1110, or the communications manager 1120, or other components or combinations of components of the device 1105. The processing system of the device 1105 may interface with other components of the device 1105, and may process information received from other components (such as inputs or signals) or output information to other components. For example, a chip or modem of the device 1105 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1105 may transmit information output from the chip or modem. Additionally, or alternatively, in some implementations, the one or more interfaces may refer to an interface between the processing system of the chip or modem and a receiver, such that the device 1105 may obtain information or signal inputs, and the information may be passed to the processing system. A person having ordinary skill in the art will readily recognize that a first interface also may obtain information or signal inputs, and a second interface also may output information or signal outputs.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the memory 1125, the code 1130, and the processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with other network entities 105, and may include a controller or scheduler for controlling communications with UEs 115 in cooperation with other network entities 105. In some examples, the communications manager 1120 may support an X2 interface within an LTE/LTE-A wireless communications network technology to provide communication between network entities 105.

The communications manager 1120 may support wireless communications at a network entity in accordance with examples as disclosed herein. For example, the communications manager 1120 may be configured as or otherwise support a means for transmitting, to a first UE, a first control message indicating a set of IMRs associated with radio link monitoring or beam failure monitoring for reference signal transmission from a second UE. The communications manager 1120 may be configured as or otherwise support a means for receiving, from the first UE, a beam failure report based on the set of IMRs. The communications manager 1120 may be configured as or otherwise support a means for transmitting, in response the beam failure report, a second control message indicating a set of parameters for beam failure recovery.

By including or configuring the communications manager 1120 in accordance with examples as described herein, the device 1105 may support techniques for reduced power consumption and faster beam recovery for a UE 115 that is experiencing beam failure or radio link failure. For example, by determining that CLI is impacting or causing a beam failure or radio link failure, the device 1105 may be configure interfering UEs 115 with updated parameters. The updated parameters may prevent CLI, and a UE 115 experiencing beam failure or radio link failure may recover the beam or radio link without performing a random access channel procedure.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the transceiver 1110, the processor 1135, the memory 1125, the code 1130, or any combination thereof. For example, the code 1130 may include instructions executable by the processor 1135 to cause the device 1105 to perform various aspects of inter-UE CLI aware beam failure detection and radio link management as described herein, or the processor 1135 and the memory 1125 may be otherwise configured to perform or support such operations.

Figure 12:
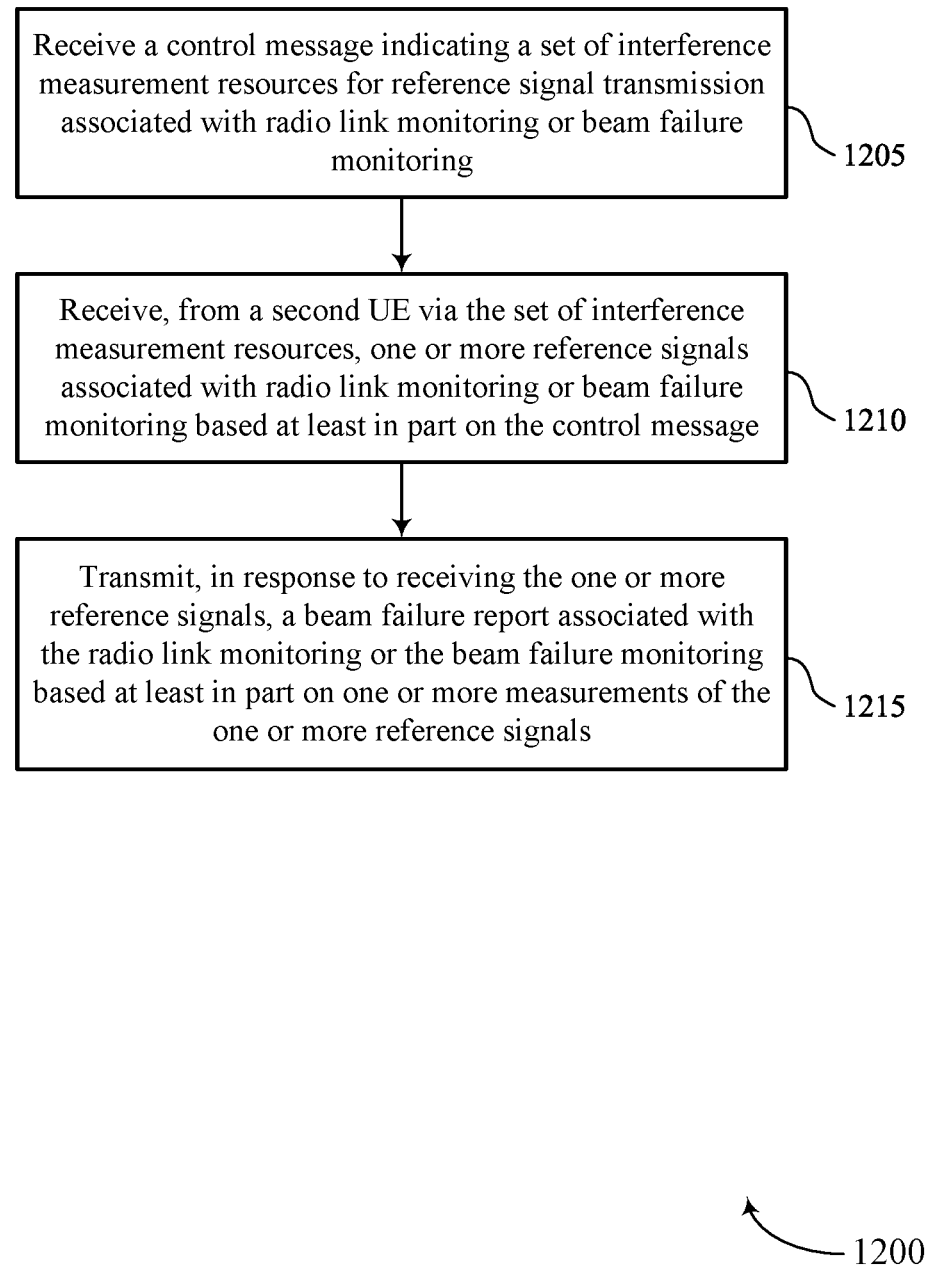
FIGS. 12 through 15 show flowcharts illustrating methods that support inter-UE CLI aware beam failure detection and radio link management in accordance with one or more aspects of the present disclosure.

FIG. 12 shows a flowchart illustrating a method 1200 that supports inter-UE CLI aware beam failure detection and radio link management in accordance with one or more aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include receiving a control message indicating a set of IMRs for reference signal transmission associated with radio link monitoring or beam failure monitoring. The operations of 1205 may be performed in accordance with examples as disclosed herein. In some examples, aspects of the operations of 1205 may be performed by an IMR configuration component 625 as described with reference to FIG. 6.

At 1210, the method may include receiving, from a second UE via the set of IMRs, one or more reference signals associated with radio link monitoring or beam failure monitoring based on the control message. The operations of 1210 may be performed in accordance with examples as disclosed herein. In some examples, aspects of the operations of 1210 may be performed by an IMR monitoring component 630 as described with reference to FIG. 6.

At 1215, the method may include transmitting, in response to receiving the one or more reference signals, a beam failure report associated with the radio link monitoring or the beam failure monitoring based on one or more measurements of the one or more reference signals. The operations of 1215 may be performed in accordance with examples as disclosed herein. In some examples, aspects of the operations of 1215 may be performed by a beam failure report component 635 as described with reference to FIG. 6.

Figure 13:
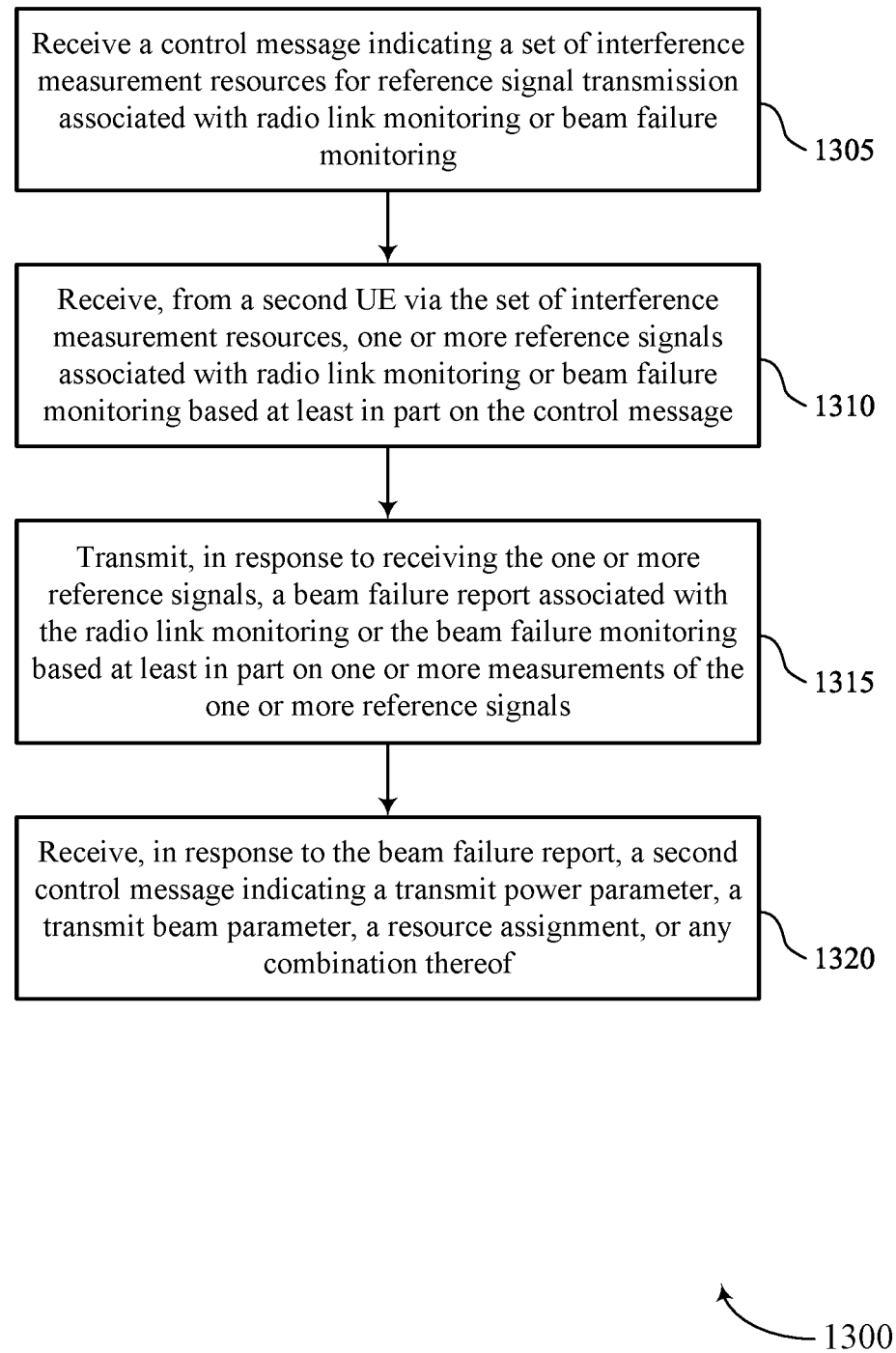

FIG. 13 shows a flowchart illustrating a method 1300 that supports inter-UE CLI aware beam failure detection and radio link management in accordance with one or more aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1305, the method may include receiving a control message indicating a set of IMRs for reference signal transmission associated with radio link monitoring or beam failure monitoring. The operations of 1305 may be performed in accordance with examples as disclosed herein. In some examples, aspects of the operations of 1305 may be performed by an IMR configuration component 625 as described with reference to FIG. 6.

At 1310, the method may include receiving, from a second UE via the set of IMRs, one or more reference signals associated with radio link monitoring or beam failure monitoring based on the control message. The operations of 1310 may be performed in accordance with examples as disclosed herein. In some examples, aspects of the operations of 1310 may be performed by an IMR monitoring component 630 as described with reference to FIG. 6.

At 1315, the method may include transmitting, in response to receiving the one or more reference signals, a beam failure report associated with the radio link monitoring or the beam failure monitoring based on one or more measurements of the one or more reference signals. The operations of 1315 may be performed in accordance with examples as disclosed herein. In some examples, aspects of the operations of 1315 may be performed by a beam failure report component 635 as described with reference to FIG. 6.

At 1320, the method may include receiving, in response to the beam failure report, a second control message indicating a transmit power parameter, a transmit beam parameter, a resource assignment, or any combination thereof. The operations of 1320 may be performed in accordance with examples as disclosed herein. In some examples, aspects of the operations of 1320 may be performed by a beam recovery component 650 as described with reference to FIG. 6.

Figure 14:
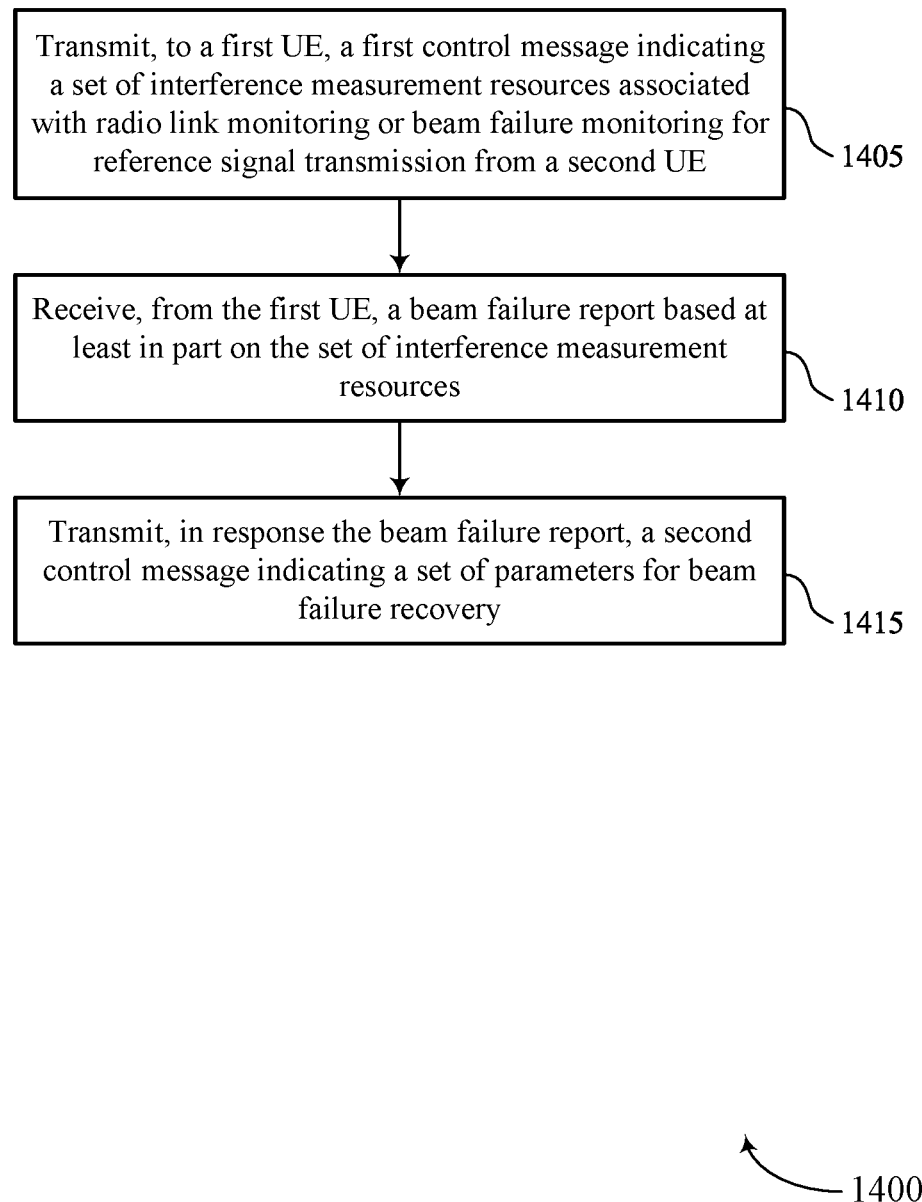

FIG. 14 shows a flowchart illustrating a method 1400 that supports inter-UE CLI aware beam failure detection and radio link management in accordance with one or more aspects of the present disclosure. The operations of the method 1400 may be implemented by a network entity or its components as described herein. For example, the operations of the method 1400 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1405, the method may include transmitting, to a first UE, a first control message indicating a set of IMRs associated with radio link monitoring or beam failure monitoring for reference signal transmission from a second UE. The operations of 1405 may be performed in accordance with examples as disclosed herein. In some examples, aspects of the operations of 1405 may be performed by an IMR configuring component 1025 as described with reference to FIG. 10.

At 1410, the method may include receiving, from the first UE, a beam failure report based on the set of IMRs. The operations of 1410 may be performed in accordance with examples as disclosed herein. In some examples, aspects of the operations of 1410 may be performed by a beam failure report component 1030 as described with reference to FIG. 10.

At 1415, the method may include transmitting, in response the beam failure report, a second control message indicating a set of parameters for beam failure recovery. The operations of 1415 may be performed in accordance with examples as disclosed herein. In some examples, aspects of the operations of 1415 may be performed by a beam recovery component 1035 as described with reference to FIG. 10.

Figure 15:
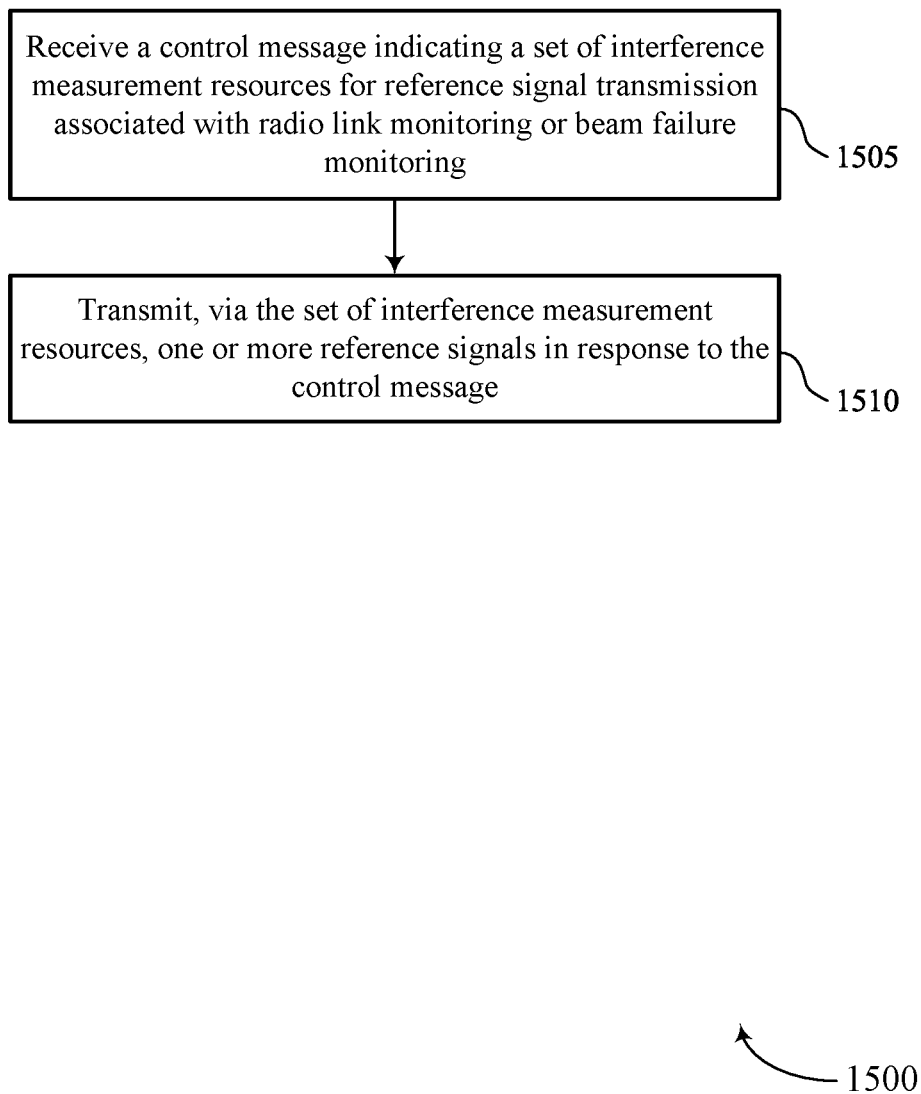

FIG. 15 shows a flowchart illustrating a method 1500 that supports inter-UE CLI aware beam failure detection and radio link management in accordance with one or more aspects of the present disclosure. The operations of the method 1500 may be implemented by a UE or its components as described herein. For example, the operations of the method 1500 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1505, the method may include receiving a control message indicating a set of IMRs for reference signal transmission associated with radio link monitoring or beam failure monitoring. The operations of 1505 may be performed in accordance with examples as disclosed herein. In some examples, aspects of the operations of 1505 may be performed by an IMR configuration component 625 as described with reference to FIG. 6.

At 1510, the method may include transmitting, via the set of IMRs, one or more reference signals in response to the control message. The operations of 1510 may be performed in accordance with examples as disclosed herein. In some examples, aspects of the operations of 1510 may be performed by an IMR transmission component 640 as described with reference to FIG. 6.

The following provides an overview of aspects of the present disclosure:

Aspect 1: A method for wireless communications at a first UE, comprising: receiving a control message indicating a set of interference measurement resources for reference signal transmission associated with radio link monitoring or beam failure monitoring; receiving, from a second UE via the set of interference measurement resources, one or more reference signals associated with radio link monitoring or beam failure monitoring based at least in part on the control message; and transmitting, in response to receiving the one or more reference signals, a beam failure report associated with the radio link monitoring or the beam failure monitoring based at least in part on one or more measurements of the one or more reference signals.

Aspect 2: The method of aspect 1, wherein transmitting the beam failure report comprises: transmitting the beam failure report indicating cross-link interference from the second UE based at least in part on measuring the one or more reference signals.

Aspect 3: The method of any of aspects 1 through 2, wherein transmitting the beam failure report comprises: transmitting the beam failure report indicating a beam failure detection based at least in part on measuring the one or more reference signals.

Aspect 4: The method of any of aspects 1 through 3, wherein transmitting the beam failure report comprises: transmitting the beam failure report indicating a radio link failure based at least in part on measuring the one or more reference signals.

Aspect 5: The method of any of aspects 1 through 4, wherein transmitting the beam failure report comprises: transmitting the beam failure report indicating a beam failure occurred based at least in part on a cross-link interference from the second UE or a channel quality reduction, or both.

Aspect 6: The method of any of aspects 1 through 5, further comprising: receiving, in response to the beam failure report, a second control message indicating a transmit power parameter, a transmit beam parameter, a resource assignment, or any combination thereof.

Aspect 7: The method of any of aspects 1 through 6, wherein receiving the control message comprises: receiving the control message indicating a sounding reference signal resource identifier, wherein the one or more reference signals from the second UE are one or more sounding reference signals.

Aspect 8: The method of any of aspects 1 through 7, wherein receiving the control message comprises: receiving the control message indicating a subcarrier spacing, a quantity of physical resource blocks, a starting physical resource block, a starting position, a quantity of symbols, a transmission configuration indicator state, or any combination thereof, for the set of interference measurement resources.

Aspect 9: The method of any of aspects 1 through 8, wherein receiving the control message comprises: receiving the control message indicating a serving cell identifier or a physical cell identifier for a serving cell of the second UE, wherein the serving cell of the second UE is different from a network entity serving the first UE.

Aspect 10: The method of any of aspects 1 through 9, wherein receiving the control message comprises: receiving the control message indicating a set of channel measurement resources for second reference signal transmission associated with the radio link monitoring or the beam failure monitoring; receiving, via the set of channel measurement resources, one or more second reference signals based at least in part on the control message; and transmitting a measurement report based at least in part on measuring the one or more second reference signals.

Aspect 11: A method for wireless communications at a network entity, comprising: transmitting, to a first UE, a first control message indicating a set of interference measurement resources associated with radio link monitoring or beam failure monitoring for reference signal transmission from a second UE; receiving, from the first UE, a beam failure report based at least in part on the set of interference measurement resources; and transmitting, in response the beam failure report, a second control message indicating a set of parameters for beam failure recovery.

Aspect 12: The method of aspect 11, wherein receiving the beam failure report comprises: receiving the beam failure report indicating cross-link interference from the second UE.

Aspect 13: The method of any of aspects 11 through 12, wherein receiving the beam failure report comprises: receiving the beam failure report indicating a beam failure detection based at least in part on the set of interference measurement resources.

Aspect 14: The method of any of aspects 11 through 13, wherein receiving the beam failure report comprises: receiving the beam failure report indicating a radio link failure based at least in part on the set of interference measurement resources.

Aspect 15: The method of any of aspects 11 through 14, wherein receiving the beam failure report comprises: receiving the beam failure report indicating a beam failure occurred based at least in part on a cross-link interference from the second UE or a channel quality reduction, or both.

Aspect 16: The method of any of aspects 11 through 15, wherein transmitting the second control message comprises: transmitting the second control message to the first UE or the second UE, or both, indicating a transmit power parameter, a transmit beam parameter, a resource assignment, or any combination thereof.

Aspect 17: The method of any of aspects 11 through 16, wherein transmitting the first control message comprises: transmitting the first control message indicating a sounding reference signal resource identifier, wherein the reference signal transmission is sounding reference signal transmission.

Aspect 18: The method of any of aspects 11 through 17, wherein transmitting the first control message comprises: transmitting the first control message indicating a subcarrier spacing, a quantity of physical resource blocks, a starting physical resource block, a starting position, a quantity of symbols, a transmission configuration indicator state, or any combination thereof, for the set of interference measurement resources.

Aspect 19: The method of any of aspects 11 through 18, wherein transmitting the first control message comprises: transmitting the first control message indicating a serving cell identifier or a physical cell identifier for a serving cell of the second UE, wherein the serving cell of the second UE is different from the network entity.

Aspect 20: The method of any of aspects 11 through 19, wherein transmitting the first control message comprises: transmitting the first control message indicating a set of channel measurement resources for second reference signal transmission associated with the radio link monitoring or the beam failure monitoring; transmitting, to the first UE, one or more reference signals via the set of channel measurement resources based at least in part on the first control message; and receiving a second measurement report from the first UE indicating measurements for the one or more reference signals.

Aspect 21: A method for wireless communications at a second UE, comprising: receiving a control message indicating a set of interference measurement resources for reference signal transmission associated with radio link monitoring or beam failure monitoring; and transmitting, via the set of interference measurement resources, one or more reference signals in response to the control message.

Aspect 22: The method of aspect 21, further comprising: receiving a second control message indicating a transmit power parameter, a transmit beam parameter, a resource assignment, or any combination thereof.

Aspect 23: The method of any of aspects 21 through 22, wherein receiving the control message comprises: receiving the control message indicating a sounding reference signal resource identifier, wherein the one or more reference signals are one or more sounding reference signals.

Aspect 24: The method of any of aspects 21 through 23, wherein receiving the control message comprises: receiving the control message indicating a subcarrier spacing, a quantity of physical resource blocks, a starting physical resource block, a starting position, a quantity of symbols, a transmission configuration indicator state, or any combination thereof, for the set of interference measurement resources.

Aspect 25: An apparatus for wireless communications at a first UE, comprising a processor; memory coupled with the processor; and instructions stored in the memory and executable by the processor to cause the apparatus to perform a method of any of aspects 1 through 10.

Aspect 26: An apparatus for wireless communications at a first UE, comprising at least one means for performing a method of any of aspects 1 through 10.

Aspect 27: A non-transitory computer-readable medium storing code for wireless communications at a first UE, the code comprising instructions executable by a processor to perform a method of any of aspects 1 through 10.

Aspect 28: An apparatus for wireless communications at a network entity, comprising a processor; memory coupled with the processor; and instructions stored in the memory and executable by the processor to cause the apparatus to perform a method of any of aspects 11 through 20.

Aspect 29: An apparatus for wireless communications at a network entity, comprising at least one means for performing a method of any of aspects 11 through 20.

Aspect 30: A non-transitory computer-readable medium storing code for wireless communications at a network entity, the code comprising instructions executable by a processor to perform a method of any of aspects 11 through 20.

Aspect 31: An apparatus for wireless communications at a second UE, comprising a processor; memory coupled with the processor; and instructions stored in the memory and executable by the processor to cause the apparatus to perform a method of any of aspects 21 through 24.

Aspect 32: An apparatus for wireless communications at a second UE, comprising at least one means for performing a method of any of aspects 21 through 24.

Aspect 33: A non-transitory computer-readable medium storing code for wireless communications at a second UE, the code comprising instructions executable by a processor to perform a method of any of aspects 21 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a first user equipment (UE), comprising:
   one or more processors;
   one or more memories coupled with the one or more processors; and instructions stored in the one or more memories and executable by the one or more processors to cause the apparatus to:
receive, from a network entity, a control message indicating a set of interference measurement resources for reference signal transmission associated with radio link monitoring or beam failure monitoring;
receive, from a second UE via the set of interference measurement resources, one or more reference signals associated with the radio link monitoring or the beam failure monitoring based at least in part on the control message; and
transmit, to the network entity, in response to receiving the one or more reference signals, a beam failure report associated with the radio link monitoring or the beam failure monitoring based at least in part on one or more measurements of the one or more reference signals, wherein the beam failure report comprises a field indicating a cause of either a beam failure detection or a radio link failure, the cause corresponding to one of a cross-link interference from the second UE or a channel quality reduction.

2. The apparatus of claim 1, wherein the instructions to transmit the beam failure report are executable by the one or more processors to cause the apparatus to:
transmit the beam failure report indicating the cross-link interference from the second UE based at least in part on measuring the one or more reference signals.

3. The apparatus of claim 1, wherein the instructions to transmit the beam failure report are executable by the one or more processors to cause the apparatus to:
transmit the beam failure report indicating the beam failure detection based at least in part on measuring the one or more reference signals.

4. The apparatus of claim 1, wherein the instructions to transmit the beam failure report are executable by the one or more processors to cause the apparatus to:
transmit the beam failure report indicating the radio link failure based at least in part on measuring the one or more reference signals.

5. The apparatus of claim 1, wherein the instructions are further executable by the one or more processors to cause the apparatus to:
receive, in response to the beam failure report, a second control message indicating a transmit power parameter, a transmit beam parameter, a resource assignment, or any combination thereof.

6. The apparatus of claim 1, wherein the instructions to receive the control message are executable by the one or more processors to cause the apparatus to:
receive the control message indicating a sounding reference signal resource identifier, wherein the one or more reference signals from the second UE are one or more sounding reference signals.

7. The apparatus of claim 1, wherein the instructions to receive the control message are executable by the one or more processors to cause the apparatus to:
receive the control message indicating a subcarrier spacing, a quantity of physical resource blocks, a starting physical resource block, a starting position, a quantity of symbols, a transmission configuration indicator state, or any combination thereof, for the set of interference measurement resources.

8. The apparatus of claim 1, wherein the instructions to receive the control message are executable by the one or more processors to cause the apparatus to:
receive the control message indicating a serving cell identifier or a physical cell identifier for a serving cell of the second UE, wherein the serving cell of the second UE is different from a network entity serving the first UE.

9. The apparatus of claim 1, wherein the instructions to receive the control message are executable by the one or more processors to cause the apparatus to:
receive the control message indicating a set of channel measurement resources for second reference signal transmission associated with the radio link monitoring or the beam failure monitoring;
receive, via the set of channel measurement resources, one or more second reference signals based at least in part on the control message; and
transmit a measurement report based at least in part on measuring the one or more second reference signals.

10. An apparatus for wireless communications at a network entity, comprising:
one or more processors;
one or more memories coupled with the one or more processors; and
instructions stored in the one or more memories and executable by the one or more processors to cause the apparatus to:
transmit, to a first user equipment (UE), a first control message indicating a set of interference measurement resources associated with radio link monitoring or beam failure monitoring for reference signal transmission from a second UE;
receive, from the first UE, a beam failure report based at least in part on the set of interference measurement resources, wherein the beam failure report comprises a field indicating a cause of either a beam failure detection or a radio link failure, the cause corresponding to one of a cross-link interference from the second UE or a channel quality reduction; and
transmit, in response the beam failure report, a second control message indicating a set of parameters for beam failure recovery based at least in part on the cause of either the beam failure detection or the radio link failure.

11. The apparatus of claim 10, wherein the instructions to receive the beam failure report are executable by the one or more processors to cause the apparatus to:
receive the beam failure report indicating the cross-link interference from the second UE.

12. The apparatus of claim 10, wherein the instructions to receive the beam failure report are executable by the one or more processors to cause the apparatus to:
receive the beam failure report indicating the beam failure detection based at least in part on the set of interference measurement resources.

13. The apparatus of claim 10, wherein the instructions to receive the beam failure report are executable by the one or more processors to cause the apparatus to:
receive the beam failure report indicating the radio link failure based at least in part on the set of interference measurement resources.

14. The apparatus of claim 10, wherein the instructions to transmit the second control message are executable by the one or more processors to cause the apparatus to:
transmit the second control message to the first UE or the second UE, or both, indicating a transmit power parameter, a transmit beam parameter, a resource assignment, or any combination thereof.

15. The apparatus of claim 10, wherein the instructions to transmit the first control message are executable by the one or more processors to cause the apparatus to:

transmit the first control message indicating a sounding reference signal resource identifier, wherein the reference signal transmission is sounding reference signal transmission.

16. The apparatus of claim 10, wherein the instructions to transmit the first control message are executable by the one or more processors to cause the apparatus to:
transmit the first control message indicating a subcarrier spacing, a quantity of physical resource blocks, a starting physical resource block, a starting position, a quantity of symbols, a transmission configuration indicator state, or any combination thereof, for the set of interference measurement resources.

17. The apparatus of claim 10, wherein the instructions to transmit the first control message are executable by the one or more processors to cause the apparatus to:
transmit the first control message indicating a serving cell identifier or a physical cell identifier for a serving cell of the second UE, wherein the serving cell of the second UE is different from the network entity.

18. The apparatus of claim 10, wherein the instructions to transmit the first control message are executable by the one or more processors to cause the apparatus to:
transmit the first control message indicating a set of channel measurement resources for second reference signal transmission associated with the radio link monitoring or the beam failure monitoring;
transmit, to the first UE, one or more reference signals via the set of channel measurement resources based at least in part on the first control message; and
receive a second measurement report from the first UE indicating measurements for the one or more reference signals.

19. A method for wireless communications at a first user equipment (UE), comprising:
receiving, from a network entity, a control message indicating a set of interference measurement resources for reference signal transmission associated with radio link monitoring or beam failure monitoring;
receiving, from a second UE via the set of interference measurement resources, one or more reference signals associated with the radio link monitoring or the beam failure monitoring based at least in part on the control message; and
transmitting, to the network entity, in response to receiving the one or more reference signals, a beam failure report associated with the radio link monitoring or the beam failure monitoring based at least in part on one or more measurements of the one or more reference signals, wherein the beam failure report comprises a field indicating a cause of either a beam failure detection or a radio link failure, the cause corresponding to one of a cross-link interference from the second UE or a channel quality reduction.

20. The method of claim 19, wherein transmitting the beam failure report comprises:
transmitting the beam failure report indicating the cross-link interference from the second UE based at least in part on measuring the one or more reference signals.

21. The method of claim 19, wherein transmitting the beam failure report comprises:
transmitting the beam failure report indicating the beam failure detection based at least in part on measuring the one or more reference signals.

22. The method of claim 19, wherein transmitting the beam failure report comprises:
transmitting the beam failure report indicating the radio link failure based at least in part on measuring the one or more reference signals.

23. The method of claim 19, further comprising:
receiving, in response to the beam failure report, a second control message indicating a transmit power parameter, a transmit beam parameter, a resource assignment, or any combination thereof.

24. A method for wireless communications at a network entity, comprising:
transmitting, to a first user equipment (UE), a first control message indicating a set of interference measurement resources associated with radio link monitoring or beam failure monitoring for reference signal transmission from a second UE;
receiving, from the first UE, a beam failure report based at least in part on the set of interference measurement resources, wherein the beam failure report comprises a field indicating a cause of either a beam failure detection or a radio link failure, the cause corresponding to one of a cross-link interference from the second UE or a channel quality reduction; and
transmitting, in response the beam failure report, a second control message indicating a set of parameters for beam failure recovery based at least in part on the cause of either the beam failure detection or the radio link failure.

25. The method of claim 24, wherein receiving the beam failure report further comprises:
receiving the beam failure report indicating the cross-link interference from the second UE.

26. The method of claim 24, wherein receiving the beam failure report further comprises:
receiving the beam failure report indicating the beam failure detection based at least in part on the set of interference measurement resources.

27. The method of claim 24, wherein receiving the beam failure report further comprises:
receiving the beam failure report indicating the radio link failure based at least in part on the set of interference measurement resources.

* * * * *